United States Patent
Sanor et al.

(10) Patent No.: US 11,494,820 B2
(45) Date of Patent: Nov. 8, 2022

(54) AUGMENTED REALITY AUTOMOTIVE ACCESSORY CUSTOMER COLLABORATIVE DESIGN AND MANUFACTURING THROUGH 3D PRINTING

(71) Applicant: TOYOTA MOTOR NORTH AMERICA, INC., Plano, TX (US)

(72) Inventors: Anthony D. Sanor, Melissa, TX (US); Jazmieka T. Smith, Fairview, TX (US); David Kleiner, Plano, TX (US); Jamese Yarber, Carrollton, TX (US); Smail Haddad, Plano, TX (US); Jessica K. Gambhir, Lewisville, TX (US); Mark Derickson, The Colony, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/538,575

(22) Filed: Nov. 30, 2021

(65) Prior Publication Data
US 2022/0188892 A1   Jun. 16, 2022

Related U.S. Application Data

(63) Continuation-in-part of application No. 17/325,823, filed on May 20, 2021.
(Continued)

(51) Int. Cl.
*G06F 30/15* (2020.01)
*G06T 19/00* (2011.01)
(Continued)

(52) U.S. Cl.
CPC ....... *G06Q 30/0621* (2013.01); *B29C 64/393* (2017.08); *B33Y 50/02* (2014.12);
(Continued)

(58) Field of Classification Search
CPC ............... G06Q 30/0621; G06Q 20/18; G06Q 30/0283; G06Q 30/0643; G06Q 50/04;
(Continued)

(56) References Cited

U.S. PATENT DOCUMENTS 10,437,925 B2   10/2019 Sebastian
10,751,800 B2   8/2020  Tenhouten et al.
(Continued)

FOREIGN PATENT DOCUMENTS

CN   106327241       1/2017
CN   106991590 A     7/2017
(Continued)

OTHER PUBLICATIONS

Pongsagon Vichitvejpaisal et al., 3D Pickup Customization System, Nov. 1, 2017, International Computer Science and Engineering Conference, pp. 1-4 (Year: 2017).*

(Continued)

*Primary Examiner* — Tam T Tran
(74) *Attorney, Agent, or Firm* — Haynes and Boone, LLP

(57) ABSTRACT

Systems and methods are provided that allow customers to collaborate with vehicle accessory manufacturers to design accessories in an augmented reality (AR) environment and manufacture the designed accessories through a rapid manufacturing technique, such as 3D printing. The disclosed systems and methods allow progression from augmented reality-designed accessories to 3D printed designs manufactured either at the dealer or at a regional printing center. The 3D printed designs may be installed on the customer's
(Continued)

vehicle, enabling a dealership to provide tailor-made, custom products designed through an AR application.

20 Claims, 18 Drawing Sheets

Related U.S. Application Data

(60) Provisional application No. 63/125,196, filed on Dec. 14, 2020.

(51) Int. Cl.

| | | |
|---|---|---|
| *G06Q 30/06* | (2012.01) | |
| *G06Q 30/02* | (2012.01) | |
| *G06Q 20/18* | (2012.01) | |
| *G06Q 50/04* | (2012.01) | |
| *B33Y 80/00* | (2015.01) | |
| *B33Y 50/02* | (2015.01) | |
| *B29C 64/393* | (2017.01) | |
| *G06F 113/10* | (2020.01) | |
| *G06F 111/16* | (2020.01) | |
| *G06F 111/18* | (2020.01) | |

(52) U.S. Cl.
CPC .............. *B33Y 80/00* (2014.12); *G06F 30/15* (2020.01); *G06Q 20/18* (2013.01); *G06Q 30/0283* (2013.01); *G06Q 30/0643* (2013.01); *G06Q 50/04* (2013.01); *G06T 19/006* (2013.01); *G06F 2111/16* (2020.01); *G06F 2111/18* (2020.01); *G06F 2113/10* (2020.01)

(58) Field of Classification Search
CPC ....... B33Y 50/02; B33Y 80/00; B29C 64/393; G06F 30/15; G06F 2111/16; G06F 2111/18; G06T 19/006
See application file for complete search history.

(56) References Cited

U.S. PATENT DOCUMENTS

| | | |
|---|---|---|
| 10,817,956 B2 | 10/2020 | Zhang et al. |
| 2002/0099628 A1 | 7/2002 | Takaota et al. |
| 2003/0065583 A1 | 4/2003 | Takaota |
| 2007/0156540 A1* | 7/2007 | Koren ................ G06Q 30/0643 705/14.51 |
| 2011/0137758 A1* | 6/2011 | Bienias ............... G06Q 30/0621 705/27.2 |
| 2011/0208339 A1* | 8/2011 | Tarte ................... G06Q 30/0621 700/98 |
| 2014/0292026 A1* | 10/2014 | Salvaggio, Jr. ........... F21K 9/64 427/256 |
| 2018/0339456 A1 | 11/2018 | Czinger et al. |
| 2020/0193726 A1 | 6/2020 | Nakthewan et al. |
| 2021/0124334 A1 | 4/2021 | Pomish |

FOREIGN PATENT DOCUMENTS

| | | |
|---|---|---|
| CN | 111932337 | 11/2020 |
| CN | 109478053 B | 4/2021 |
| KR | 101617279 B1 | 5/2016 |
| WO | 2021002491 | 1/2021 |

OTHER PUBLICATIONS

George Q. Huang et al., RFID-Enabled Real-Time Manufacturing for Automotive Part and Accessory Suppliers, Jul. 1, 2010, IEEE Xplore, pp. 1-6 (Year: 2010).*

Atiyeh, Clifford. "Mini Cooper Owners Can Design Custom 3D-Printed Parts," Dec. 26, 2017, 3 pages, URL: https://www.caranddriver.com/news/a14500592/mini-cooper-owners-can-design-cusom-3d-printed-parts/.

Colquhoun, Steve. "Are you ready to augment your reality?" Oct. 19, 2020, 6 pages, URL: https://www.mercedes-benz.com.au/passengercars/experience/mercedes-me-magazine/innovation/articles/augmented-reality/stage.module.html.

"Customer experience in a new dimension: 3D Augmented Reality App Mercedes cAR and Virtual Reality goggles: Mercedes-Benz is accelerating digitalisation in Sales," Apr. 26, 2018, 8 pages, URL: https://media.daimler.com/marsMediaSite/en/instance/ko.xhtml?oid=40291230.

Arworks "Top 10 Augmented Reality Car Apps," Nov. 20, 2013, 4 pages, URL: http://www.arworks.com/en/top-10-augmented-reality-car-apps/.

Morozova, Anastasia. "How Augmented Reality Will Change Driving and Car Manufacturing," Jan. 24, 2019, 16 pages, URL: https://jasoren.com/ar-in-automotive/.

\* cited by examiner

AUGMENTED REALITY AUTOMOTIVE ACCESSORY CUSTOMER COLLABORATIVE DESIGN AND MANUFACTURING THROUGH 3D PRINTING

CROSS-REFERENCE TO RELATED APPLICATIONS

This application is a continuation-in-part of U.S. Nonprovisional application Ser. No. 17/325,823, entitled "AUGMENTED REALITY AUTOMOTIVE ACCESSORY CUSTOMER COLLABORATIVE DESIGN AND DISPLAY," filed on May 20, 2021, which claims the benefit of U.S. Provisional Application No. 63/125,196, entitled "SYSTEMS AND METHODS FOR ENABLING PRECISE OBJECT INTERACTION WITHIN AN AUGMENTED REALITY ENVIRONMENT," filed on Dec. 14, 2020, the disclosures of which are hereby incorporated by reference in their entireties.

TECHNICAL FIELD

The present disclosure relates generally to systems and methods of augmented reality and, more particularly, to methods and systems for the collaborative design and manufacturing of vehicle accessories through 3D printing.

BACKGROUND

Augmented reality (AR) systems provide a means for virtual objects to be presented in a real-world (physical) environment when the real-world environment is viewed through a device capable of capturing image data of the real-world environment and displaying the real-world environment on a user display device. Virtual objects presented in the real-world environment may be overlays presented to a user or as virtual objects presented to appear as real-world objects within the environment.

In the automotive industry, customers often desire to customize their vehicles with various accessories. However, typically these customers are forced to view the accessories in magazines or other images and are unable to view the accessory on the real-world vehicle. As a result, customers are often forced to make substantial investments in accessories without really knowing if they like the look on the accessories on their vehicles. In addition, those customers often lack the ability to customize the accessories as they desire. Ultimately, these shortcomings lead to increased customer dissatisfaction with the vehicle buying experience. Some applications allow customers to collaboratively build custom accessories in an AR environment. While the unique accessory designed during this process has allowed meeting the idiosyncratic needs of each customer, it becomes difficult to manufacture the custom designs at scale.

SUMMARY

The present disclosure provides systems and methods for collaborative customization and manufacturing of custom vehicle accessories through 3D printing. The present disclosure provides a (seamless) progression from AR-designed accessories to 3D printed designs manufactured at either a dealer (e.g., a kiosk at a dealer) or a local/regional printing center. For example, an AR-designed part may be 3D printed at the dealer or at a regional printing center and delivered to the dealership, where the 3D printed part is subsequently installed on a customer's vehicle. As a result, bespoke products may be produced that have been designed in an AR environment.

Embodiments of the present disclosure provide a computer-implemented method for manufacturing a vehicle accessory custom-designed in an AR environment. The computer-implemented method may include receiving a vehicle accessory customized by a user through an AR design tool, determining whether the customized vehicle accessory can be fabricated using a rapid manufacturing process, generating a cost and lead-time estimate for presentation to the user, and prompting the user for a decision to purchase the customized vehicle accessory in response to presenting the cost and lead-time estimate to the user.

Embodiments of the present disclosure provide a system for manufacturing a vehicle accessory custom-designed in an AR environment. The system may include a processor to perform operations, including receiving a vehicle accessory customized by a user through an AR design tool, determining whether the customized vehicle accessory can be fabricated using a rapid manufacturing process, generating a cost and lead-time estimate for presentation to the user, and prompting the user for a decision to purchase the customized vehicle accessory in response to presenting the cost and lead-time estimate to the user.

Embodiments of the present disclosure provide a method for 3D printing a vehicle accessory custom-designed in an AR environment. The method may include receiving, from a user through an AR design tool, a customized vehicle accessory, determining whether the customized vehicle accessory can be fabricated using a 3D printing process, generating a cost and lead-time estimate for presentation to the user, and prompting the user for a decision to purchase the customized vehicle accessory in response to presenting the cost and lead-time estimate to the user.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

Aspects of the present disclosure are best understood from the following detailed description when read with the accompanying figures.

DETAILED DESCRIPTION

Figure 1:
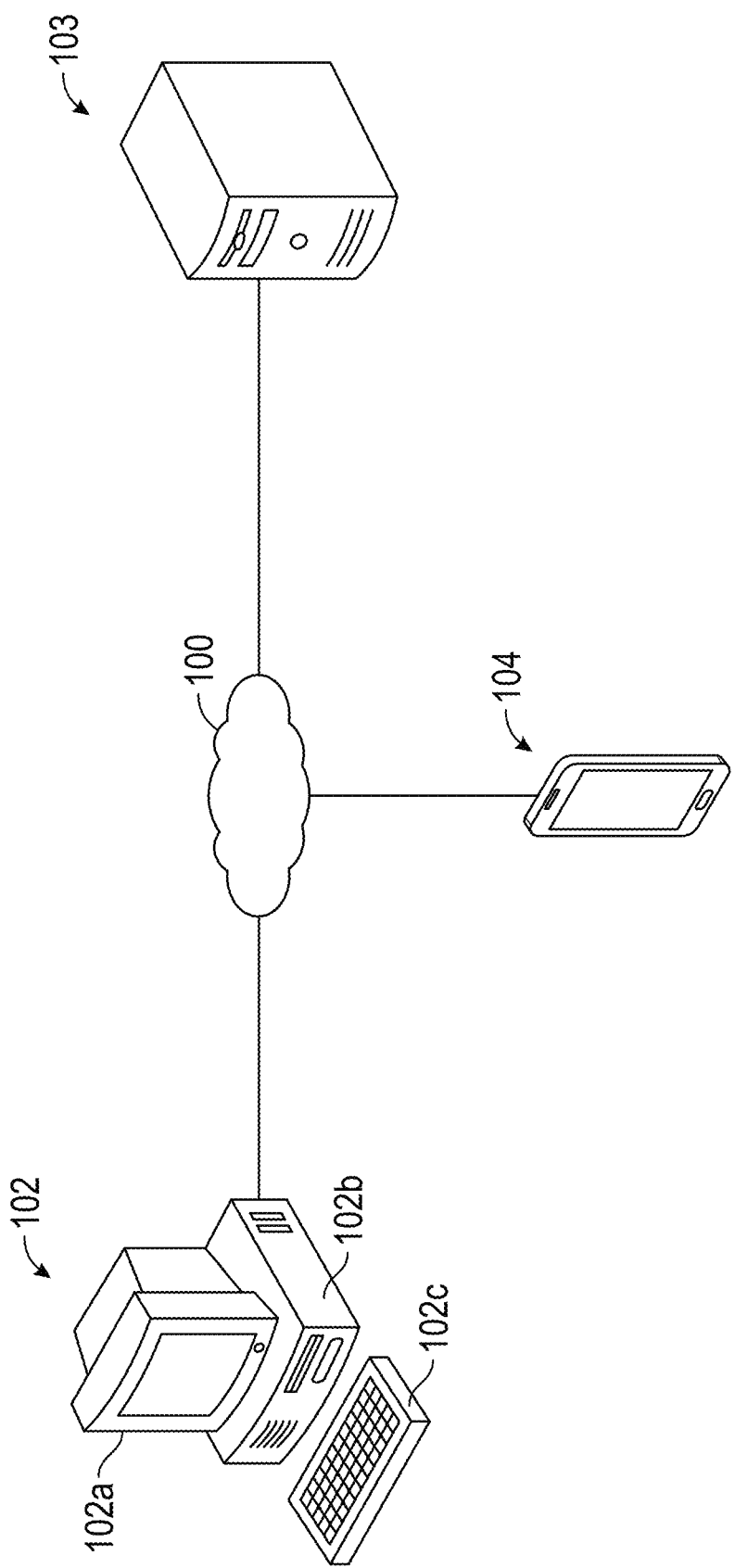
FIG. 1 schematically depicts an example computing network for providing an augmented reality system, according to one or more embodiments described and illustrated herein.

Illustrative embodiments and related methods of the present disclosure are described below as they might be employed in a system and method for collaborative design and display of vehicle accessories in an augmented reality environment. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. Further aspects and advantages of the various embodiments and related methodologies of the disclosure will become apparent from consideration of the following description and drawings.

As will be described below, illustrative methods and embodiments of the present disclosure allow customers to collaborate with vehicle accessory manufacturers to design and display the accessories in an augmented reality environment. Embodiments described herein are generally related to improving a customer's decision making and purchasing experience when viewing a physical showroom model (or other real-world model) of a vehicle they intend to purchase and/or customize. For example, dealerships generally have only a few vehicles available for viewing in a showroom. However, there are generally many custom options and/or accessories that may be included on the vehicle to meet a customer's desired vehicle.

Typically, the accessory may be depicted on a computer in a fixed number of views so that the customer may get a sense for what the accessory would look like on their vehicle. However, this has several limitations. For example, the customer may wish to view multiple accessories together and get a better sense for how the one or more accessories appear when viewed from many angles which are not available on a small graphical model provided on a computer or in a brochure. Additionally, the user may want to switch between several options to find the one that best fits their taste. Further, tension can arise in the decision-making process because customers can be confronted with making decision to include an accessory that costs hundreds or thousands of dollars without really having a sense for what it would look like when installed on their vehicle.

Accordingly, embodiments of the present disclosure are directed to reducing or eliminating this tension by providing an augmented reality system that a user may deploy in a showroom or other location while viewing image data of a real vehicle through an electronic device and virtually customizing the vehicle with accessories while moving around the vehicle to view the virtualized accessory. The augmented reality system allows a user to select and customize the accessory, and then virtually install the accessory onto a real-world vehicle so the customer can see how the installed accessory looks and whether they would like to further customize the feature.

The system described herein also delivers a realistic experience to the user. The virtualized accessories must appear as realistic as possible and seamlessly integrate with the image data of the real-world vehicle. In general, graphic rendering for an augmented reality environment that fuses real-world image data with virtual features requires large amounts of graphics processing resources. However, these resources may not be available on conventional systems (e.g., handheld electronic devices) such as a smartphone that the user can practically bring into a showroom. Therefore, there is a need to provide a system and method that can deliver a comparable or better augmented reality experience on a handheld electronic device. Such a system and method are described herein.

Embodiments of the present disclosure provide an accurate, precise, and seamless presentation of one or more virtual accessories attached to an object identified within a real-world environment. In particular, the embodiments described herein provide systems and methods that identify a real-world object in an environment captured by an imaging device and register the identified object with a multi-dimensional wireframe model of the object so that virtualized accessories may be seamlessly associated with, or "locked onto," the real-world object in an augmented reality environment presented to a user on a display. Methods of identifying the real-world object and registering the identified object with the multi-dimensional wireframe model of the object will be described in detail herein.

It should be understood that, although the present disclosure describes the systems and methods for providing virtual accessories attached to physical vehicles, the technology described may be utilized in other contexts. The technology, for example, without limitation may be utilized in generating augmented reality environments for home building and/or renovation, clothing fitting, modeling and purchasing, and the like.

Embodiments described herein utilize a device such as a smartphone, laptop, tablet or other handheld computing device that includes an imaging device, a processor, memory, and a display. The imaging device may capture image data of an environment. The image data may be analyzed to identify one or more real-world objects within the environment. Moreover, to generate an augmented reality environment, the image data captured by the imaging device may be presented in real-time or near real-time on the display of the device. In some instances, the display may be the display of the device or may be a virtual reality headset or glasses.

The illustrative embodiments disclosed herein also describe systems and methods that utilize a trained machine learning model to identify real-world objects in an environment captured in the image data thereby facilitating precise interactions between virtual accessories and real-world objects within an augmented reality environment. More specifically, the augmented reality system described herein may utilize a trained machine learning model such as a neural network or other form of artificial intelligence system to identify a real-world object from image data captured by an imaging device.

As used herein, identifying a real-world object may refer to both the detection and classification of an object within the image data. Furthermore, a machine learning model may be implemented during registration of the multi-dimensional wireframe model of the identified object and the identified object captured in the image data being captured by the imaging device. For example, the machine learning model may be trained to identify whole objects and isolated features of an object so that registration of the isolated features of the object and the multidimensional wireframe model may be accurately and precisely mapped to each other. The multidimensional wireframe model may be a predefined computer aided model of the object. For example, the multidimensional wireframe model may be a three-dimensional spatial model that may appear as overlaying portions of an image or a live video stream of an object (e.g., a vehicle) within a physical environment. Moreover, the augmented reality system described herein may utilize the trained machine learning model to associate a virtual object (e.g., a virtual accessory) with a portion of the virtual wireframe model such that the virtual object may appear precisely positioned on or integrated with the object (e.g., a vehicle) within the physical environment.

In embodiments, an AR-web-based or device-based application enables a user to select, customize, and visualize custom accessories on a vehicle. An interface is provided such that the user may review base features of their custom design and optionally add or subtract customized features to the base elements. For example, a base element may be a bumper, running boards, a grill, a roof rack assembly or the like. The customized features may be treads, attachments, design features or the like.

Once the custom accessory AR design process is complete, a customer may then submit a desired accessory to a design or sales department associated with a dealership. A computing device completes an analysis of the custom accessory to determine whether the accessory is available for sale. The available for sale analysis includes a determination of whether the custom design can be fabricated using 3D printing processes and whether the resulting component would meet quality and durability criteria. If the custom design is determined not to be available for sale, then the user is notified and the design is stored in a collaboration design recommendation database, so that it may later be manufactured or fabricated using processes other than 3D printing to make it available for sale. However, if the custom design is determined to be available for sale, then the process proceeds with completing a cost, installation, and lead-time assessment.

The cost, installation, and lead-time assessment may include a material assessment that includes an analysis and/or optimization of the design by evaluating the attributes of the features such as the density, size, color, compression, flex, geometry complexity, thermal properties, dimensional accuracy and the like. The cost, installation, and lead-time assessment may include a lead-time analysis that analyzes the availability of material and time to process a finished good. A volume analysis is conducted in conjunction with a cost analysis that results in generating a quote for the custom accessory. The analysis includes evaluating the demand for the custom accessory or sub-components thereof from requests submitted by one or more customers. The analysis also includes determining the material waste, material type and cost, the labor and overhead to fabricate the feature, transportation to the customer and energy usage throughout the process. The result of the cost, installation, and lead-time assessment may be a presentation to the customer, for example, on their device of the amount for the custom accessory and an estimated availability or delivery of the custom accessory.

The customer is then prompted to make a purchase decision. When a decision to purchase the custom accessory is made, the AR 3D model is sent to be a fabrication location for processing and fabricating into a 3D printed component.

The following will now describe certain illustrative systems and methods in more detail with reference to the drawings and where like numbers refer to like structures. FIG. 1 schematically depicts an example computing network for providing an augmented reality system, according to one or more embodiments described and illustrated herein. As illustrated in FIG. 1, a network 100 may include a wide area network, such as the internet, a local area network (LAN), a mobile communications network, a public service telephone network (PSTN) and/or other network and configured to electronically connect a computing device 102, a server 103 for managing content and training machine learning models, and an electronic device 104 enabled with an application for a user to use with a publication. The network 100 may be configured to electronically and/or communicatively connect the computing device 102, the server 103, and/or the electronic device 104.

The computing device 102 may include a display 102a, a processing unit 102b and an input device 102c, each of which may be communicatively coupled to together and/or to the network 100. The computing device 102 may be used to develop multi-dimensional wireframe models for objects such as vehicles and virtual accessories. The computing device 102 may also be utilized to interface with a server 103 to develop, update, and/or repair machine learning models for identifying object and/or defining and/or updating registration processes for registering (i.e., correctly aligning) the multi-dimensional model of an identified object with the identified object in the real-world as captured by the imaging device. The server 103 may be any computing device configured to store data, host internet-based applications, configured to be searchable by another device and/or the like. In some embodiments, the server 103 maintains a repository of current multi-dimensional wireframe models for objects such as a number of makes, models, and trims of vehicles and a plurality of virtual models for accessories of the same. The virtual models of accessories may include, for example, virtual models of running boards, wheels, tires, roof racks, grilles, and/or the like.

The electronic device 104 may include one or more components such as an imaging device (e.g., a camera), to capture images of one or more objects in a physical environment of the user. Additionally, the electronic device 104 may be configured to access a software application within which a trained machine learning model may be embedded. The electronic device 104 may, via a software application and the network 100, retrieve a multi-dimensional wireframe model for use in the augmented reality environment from the one or more databases associated with the server 103, as described in greater detail below. That is, the server 103 may include one or more databases, within which a plurality of data related to various characteristics of real world objects may be stored. In embodiments, the computing device 102 the data stored in these databases to associate a virtual object (e.g., a virtual component) with a portion of the virtual wireframe model such that the virtual object may appear precisely positioned on or integrated with a real-world object within the augmented reality environment.

Additionally, included in FIG. 1 is the electronic device 104. The electronic device 104 may be any mobile or personal computing device such as a laptop, tablet, smartphone, or the like that a user may use to capture image data of a physical real-world object they desire to customize virtually with virtual accessories, for example, in an effort to visualize what the accessory would look like on their vehicle. It is also understood that while the electronic device 104, the computing device 102, and the server 103, are depicted as individual devices, these are merely examples. More specifically, in some embodiments, any type of computing device (e.g., mobile computing device, personal computer, server, and the like) may be utilized for any of these components. Additionally, while each computing device is illustrated in FIG. 1 as a single piece of hardware, this is also an example.

Figure 2:
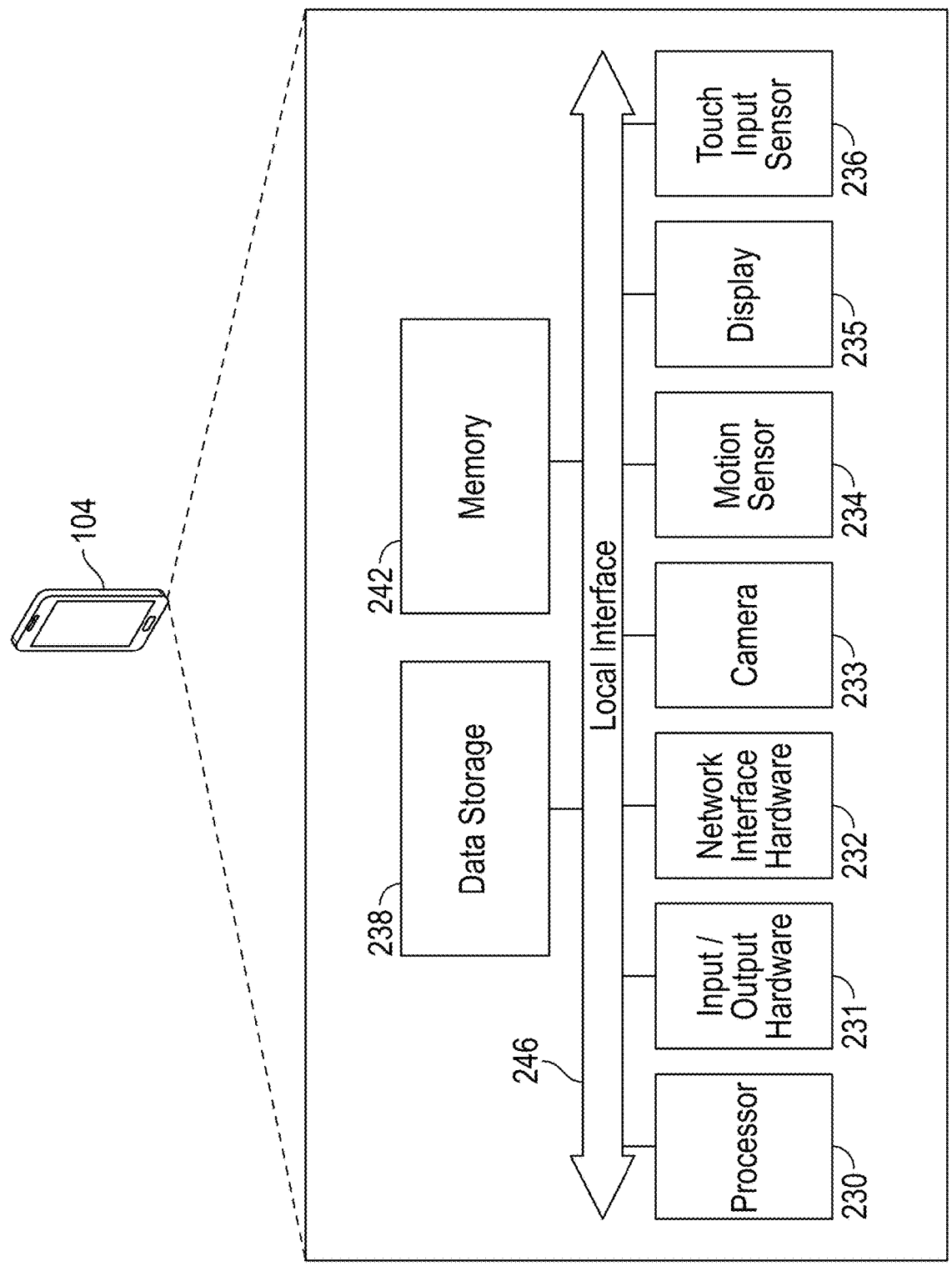
FIG. 2 schematically depicts an example electronic device for providing an augmented reality environment to a user, according to one or more embodiments described and illustrated herein.

FIG. 2 schematically depicts an example electronic device 104 for providing an augmented reality environment to a user, according to one or more embodiments described and illustrated herein. As illustrated in FIG. 2, the electronic device 104 may include a processor 230, input/output hardware 231, network interface hardware 232, a camera 233, a motion sensor 234, a display 235, a touch input sensor 236, a data storage component 238, which optionally stores one or more multi-dimensional wireframe models and/or virtual accessories (e.g., models of the virtual accessories) and a memory component 242. The memory component 242 may be machine readable memory (which may also be referred to as a non-transitory processor readable memory). The memory component 242 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 242 may be configured to store operating logic and/or a machine learning model (ML model), each of which may be embodied as a computer program, firmware, or hardware, as an example.

A local interface 246 is also included in FIG. 2 and may be implemented as a bus or other interface to facilitate communication among the components of the electronic device 104. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 210. In some embodiments, the machine-readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The local interface 246 may be formed from any medium that is capable of transmitting a signal such as, for example, conductive wires, conductive traces, optical waveguides, or the like. Moreover, the local interface 246 may be formed from a combination of mediums capable of transmitting signals. In one embodiment, the local interface 246 comprises a combination of conductive traces, conductive wires, connectors, and buses that cooperate to permit the transmission of electrical data signals to components such as processors, memories, sensors, input devices, output devices, and communication devices. Accordingly, the local interface 246 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The local interface 246 communicatively couples the various components of the electronic device 104. As used herein, the term "communicatively coupled" means that coupled components are capable of exchanging data signals with one another such as, for example, electrical signals via conductive medium, electromagnetic signals via air, optical signals via optical waveguides, and the like.

The processor 230 may include any processing component(s) configured to receive and execute programming instructions (such as from the data storage component 238 and/or the memory component 242). The instructions may be in the form of a machine-readable instruction set stored in the data storage component 238 and/or the memory component 242. The input/output hardware 231 may include a monitor, keyboard, mouse, printer, microphone, speaker, and/or other device for receiving, sending, and/or presenting data. The network interface hardware 232 may include any wired or wireless networking hardware, such as a modem, LAN port, Wi-Fi card, WiMax card, mobile communications hardware, and/or other hardware for communicating with other networks and/or devices.

The processor 230 is communicatively coupled to the other components of the electronic device 104 by the local interface 246. Accordingly, the local interface 246 may communicatively couple any number of processors with one another, and allow the modules coupled to the local interface 246 to operate in a distributed computing environment. Specifically, each of the modules may operate as a node that may send and/or receive data.

The camera 233 may be any device having an array of sensing devices (e.g., pixels) capable of detecting radiation in an ultraviolet wavelength band, a visible light wavelength band, or an infrared wavelength band. The camera 233 may have any resolution. The camera 233 may be an omni-directional camera, or a panoramic camera. In some embodiments, one or more optical components, such as a mirror, fish-eye lens, or any other type of lens may be optically coupled to camera 233. In embodiments, the camera 233 may have a broad angle feature that enables capturing digital content within a 150 degree to 180-degree arc range. Alternatively, the camera 233 may have a narrow angle feature that enables capturing digital content within a narrow arc range, e.g., 60 degrees to 90-degree arc range. In embodiments, the one or more cameras 233 may be capable of capturing high definition images in a 720-pixel resolution, a 1080-pixel resolution, and so forth. Alternatively, or additionally, the camera 233 may have the functionality to capture a continuous real time video stream for a predetermined time period.

The motion sensor 234 may include any device capable of detecting acceleration changes in the electronic device 104 and/or roll, pitch, and yaw rotations. For example, the motion sensors 234 may include an accelerometer, a gyroscope, or the like.

The display 235 may include any medium capable of transmitting an optical output such as, for example, a cathode ray tube, light emitting diodes, a liquid crystal display, a plasma display, a virtual reality headset or glasses, or the like. Moreover, the display 235 may be a touchscreen enabled by a touch input sensor 236 that, in addition to providing optical information, detects the presence and location of a tactile input upon a surface of or adjacent to the display 235.

It should be understood that the data storage component 238 may reside local to and/or remote from the electronic device 104 and may be configured to store one or more pieces of data for access by the electronic device 104 and/or other components. It should also be understood that the components illustrated in FIG. 2 are merely exemplary and are not intended to limit the scope of this disclosure. More specifically, while the components in FIG. 2 are illustrated as residing within the electronic device 104, this is merely an example. In some embodiments, one or more of the components may reside external to the electronic device 104. Similarly, while FIG. 2 is directed to the electronic device 104, other components such as the computing device 102 and the server 103 may include similar hardware, software, and/or firmware.

The network interface hardware 214 may include a chip-set (e.g., antenna, processors, machine readable instructions, etc.) to communicate over wireless computer networks such as, for example, wireless fidelity (Wi-Fi), WiMax, Bluetooth, IrDA, Wireless USB, Z-Wave, ZigBee, or the like. In some embodiments, the network interface hardware 214 includes a Bluetooth transceiver that enables the electronic device 104 to exchange information with the server 103 via Bluetooth communication.

Figure 3:
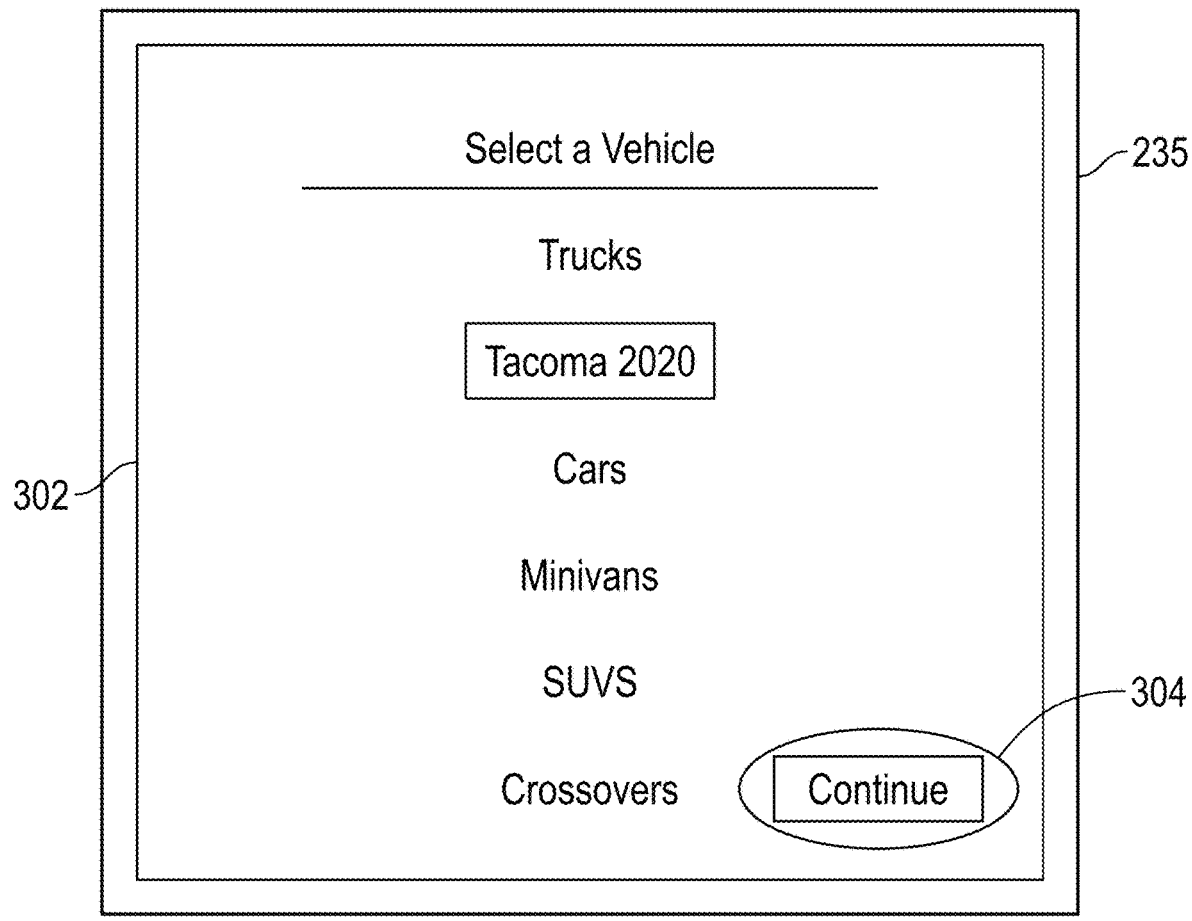
FIG. 3 depicts an example display providing an illustrative graphical user interface menu, according to one or more embodiments described and illustrated herein.
Figure 4:
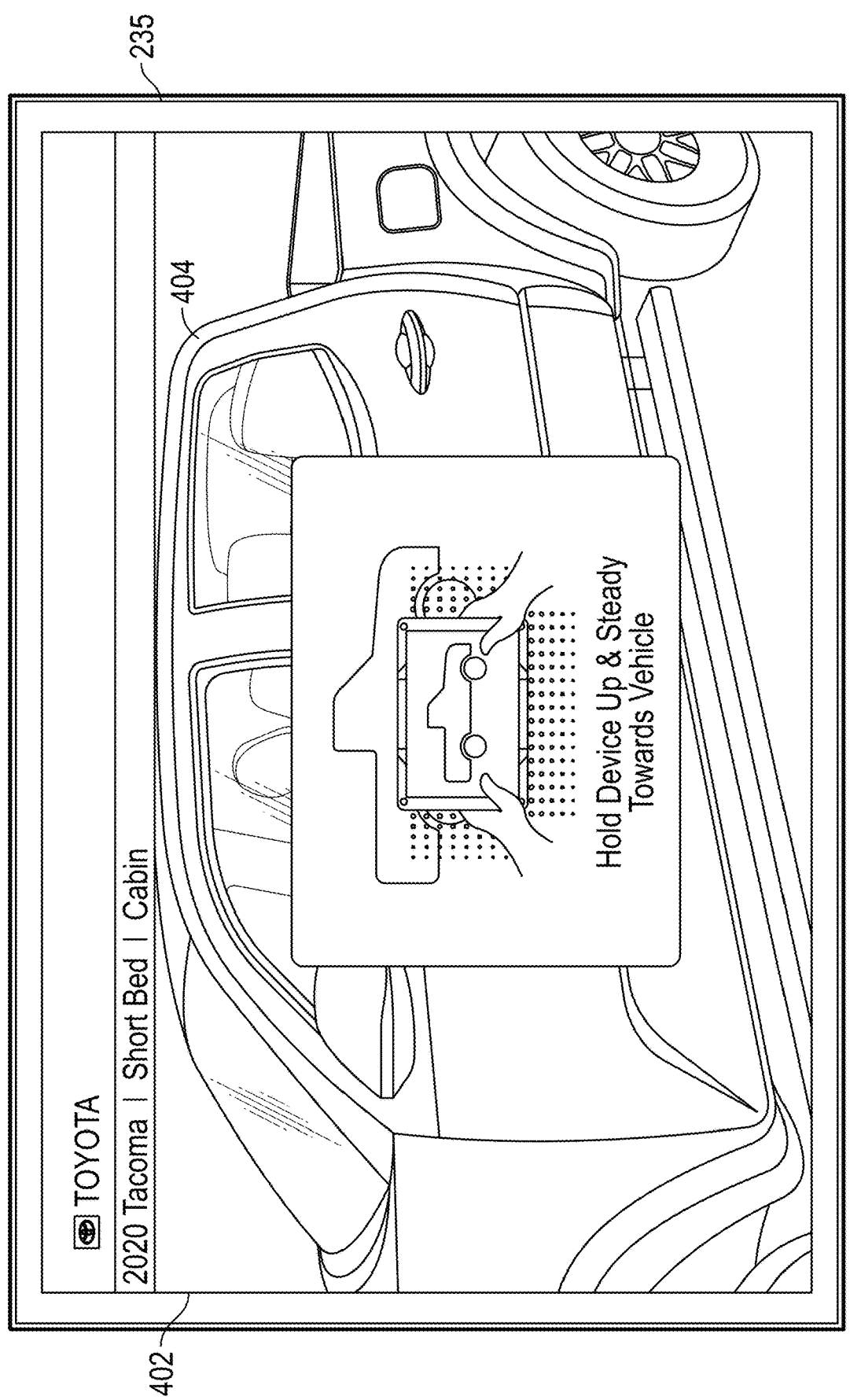
FIG. 4 depicts an illustrative instruction screen on the display of the device for identifying an object within the environment, according to one or more embodiments described and illustrated herein.

Referring now to FIGS. 3-12, illustrative walkthrough of the operation of the augmented reality system. FIG. 3 depicts an example home page 302 (e.g., a graphical user interface menu) displayed on a display 235 of the electronic device 104, according to one or more embodiments described and illustrated herein. In some embodiments, the example home page 302 may be displayed on the display 235 of the electronic device 104 responsive to a user accessing a software application, e.g., by clicking an icon displayed on a screen of the electronic device 104. In embodiments, the home page 302 may include a plurality of user selectable icons, e.g., such as "Trucks", "Cars", "Minivans", "SUVs", and "Crossovers", which correspond to various vehicle brands, makes, models, and the like. In some embodiments, a user may select a particular brand of truck, such as Tacoma 2020, and choose an icon labeled "Continue" to initiate operation of the augmented reality system described herein. Upon selection of the "Continue" icon, the processor 230 may instruct the software application to open an initiation page, as depicted in FIG. 4.

FIG. 4 depicts an initiation page displayed on a display 235 of the electronic device 104, according to one or more embodiments described and illustrated herein. In embodiments, a user may recognize the type of a vehicle located within a certain proximity of the user in a physical environment of the user, e.g., on the showroom floor of a car show, on the floor of a dealership, etc. Thereafter, in some embodiments, the user may choose the type of vehicle (e.g., a Truck) and select the "continue icon 302" from the example home page 302, as depicted in FIG. 3. In response, the processor 230 may instruct the software application to display an initiation page 402 on the display 235 of the electronic device 104. In embodiments, the initiation page 402 may include data related to various characteristics of the example vehicle 404, e.g., such as the year, make, and model of the vehicle. Additionally, in embodiments, the initiation page 402 may include a real-time video stream of the example vehicle 404 that is captured in the physical environment of the user. In other words, a live video stream of the example vehicle 404 as present in the physical environment of the user (e.g., on the floor of a car dealership). The data related to the characteristics of the example vehicle 404 may be displayed on the initiation page 402 adjacent to the live video stream (or an image) of the vehicle.

In embodiments, the initiation page may instruct a user to perform one or more actions relative to the example vehicle 404, e.g., place the camera 233 in a particular position, at a particular angle, and/or at a particular distance relative to the example vehicle 404.

The electronic device 104 may receive from the camera 233 image data of the environment including the vehicle 404. The electronic device 104 then processes the image data to identify a real-world object in the environment captured by the camera. For example, the electronic device 104 may implement a machine learning model to analyze the image data and determine the classification such as the brand, make, model, and or trim of the vehicle in the image data. The machine learning model may be trained using training images that include a variety of information related to different vehicles, e.g., colors, makes, models, size of vehicle wheels, vehicle brand logos, decals, number of doors in a vehicle, shapes, contours, and dimensions of vehicles, etc. Additionally, these training images may have been captured under different lighting and environmental conditions. These images may also include numerous labels corresponding to each of these vehicle characteristics. In embodiments, the training images may be input into a supervised machine learning environment that may include a supervised training interface in which an individual may add, delete, or modify these labels.

Additionally, in certain illustrative embodiments, upon completion of the training, the machine learning model may be configured to identify, in real time, one or more characteristics of a particular vehicle (e.g., dimensions, contours, etc.) from analyzing one or more perspective images of the vehicle that may be captured in the physical environment of the user. It is noted that a large number of training images, which include a substantial number and diversity of data related to various vehicles, results in a robustly trained machine learning model that is configured to efficiently and accurately identify the dimensions (and other characteristics) of a vehicle. In embodiments, the machine learning model may be trained using machine learning algorithms such as, e.g., OpenML or TensorFlow. Other machine learning algorithms with comparable characteristics are also contemplated.

Figure 5:
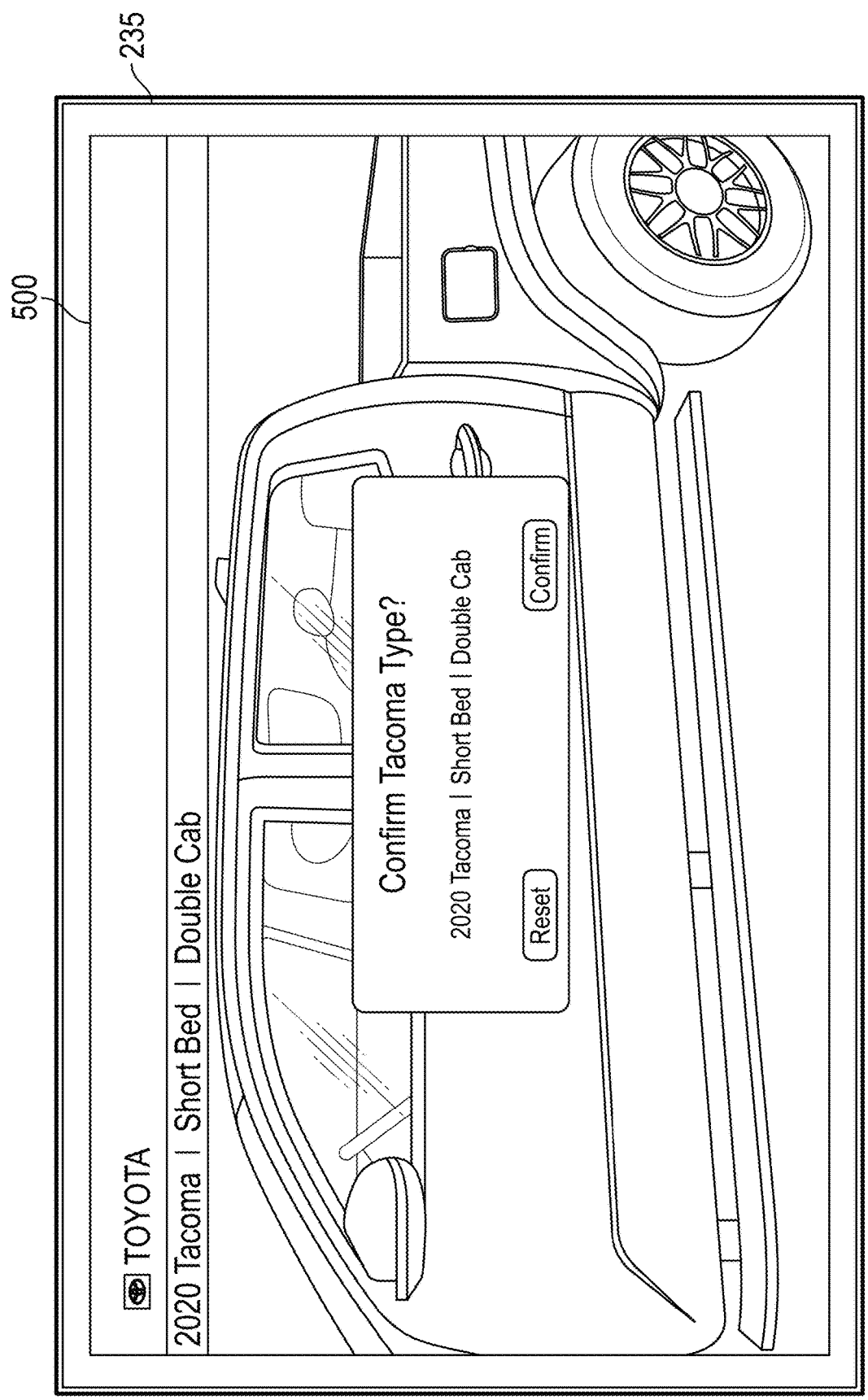
FIG. 5 depicts an illustrative confirmation menu on the display of the device for confirming identification of the object within the environment, according to one or more embodiments described and illustrated herein.

For example, upon placing the camera 233 in a particular position, a vehicle brand and model confirmation page 500, as depicted in FIG. 5, may also be displayed on the display 235. By selecting a prompt that is displayed, e.g., "confirm" icon, the user may manually classify the example vehicle 404 according to the vehicle's make and model. In some embodiments, the system described herein may automatically classify the example vehicle 404 as a 2020 Tacoma TRD, short bed, double cab truck utilizing a plurality of image recognition techniques. These techniques may involve analyzing the contours, dimensions, and other such features of the example vehicle 404 and performing a comparison of these features with one or more databases associated with the server 103, which stores features, dimensions, and contours of various vehicles in one or more databases. One or more machine learning techniques may also be utilized as part of the image recognition techniques to accurately and efficiently classify the example vehicle 404.

Figure 6:
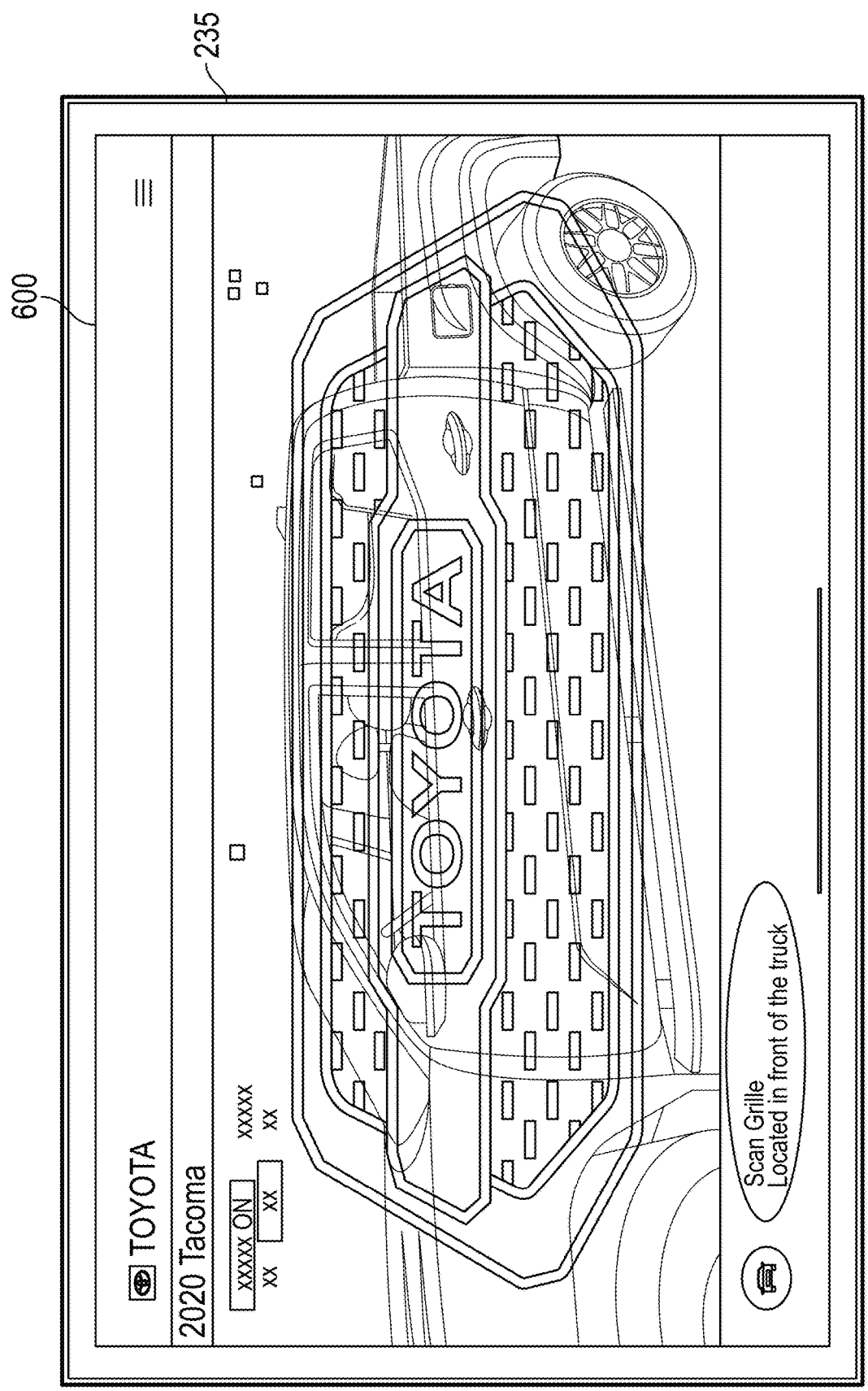
FIG. 6 depicts an example overlay of a registration feature for aligning with the real-world feature on the identified object in the real-world environment, according to one or more embodiments described and illustrated herein.

FIG. 6 depicts an example page in the display 235 in which a registration feature 600 such as virtual overlay of a grille is displayed, according to one or more embodiments described and illustrated herein. As illustrated in FIG. 6, the registration feature 600 may appear as overlaying or superimposed over portions of the example vehicle 404 located in the physical environment of the user. Specifically, the registration feature 600 may appear as overlaying a live video stream (or an image) of the example vehicle 404 located within the physical environment of the user. In embodiments, the simultaneous display of both the registration feature 600 in the virtual environment and the live video stream of the example vehicle 404 in the physical environment on the display 235 may be the augmented reality environment of the augmented reality system described herein. Within this augmented reality environment, a user may perform various actions relative to example vehicle 404, as depicted and described with reference to FIGS. 8-11.

The registration feature 600 may vary in shape, size, and dimensions, depending on the type and brand of a vehicle. The page on which the registration feature 600 appears may also include instructions for the user to perform certain actions with respect to the example vehicle 404, such as positioning the registration feature 600 near a front portion of the example vehicle 404. The front portion of the example vehicle 404 may include a grille shaped pattern that is similar to the registration feature 600. In embodiments, as depicted in FIG. 6, an instruction may read "Scan Grille Located In Front of the Truck".

Figure 7:
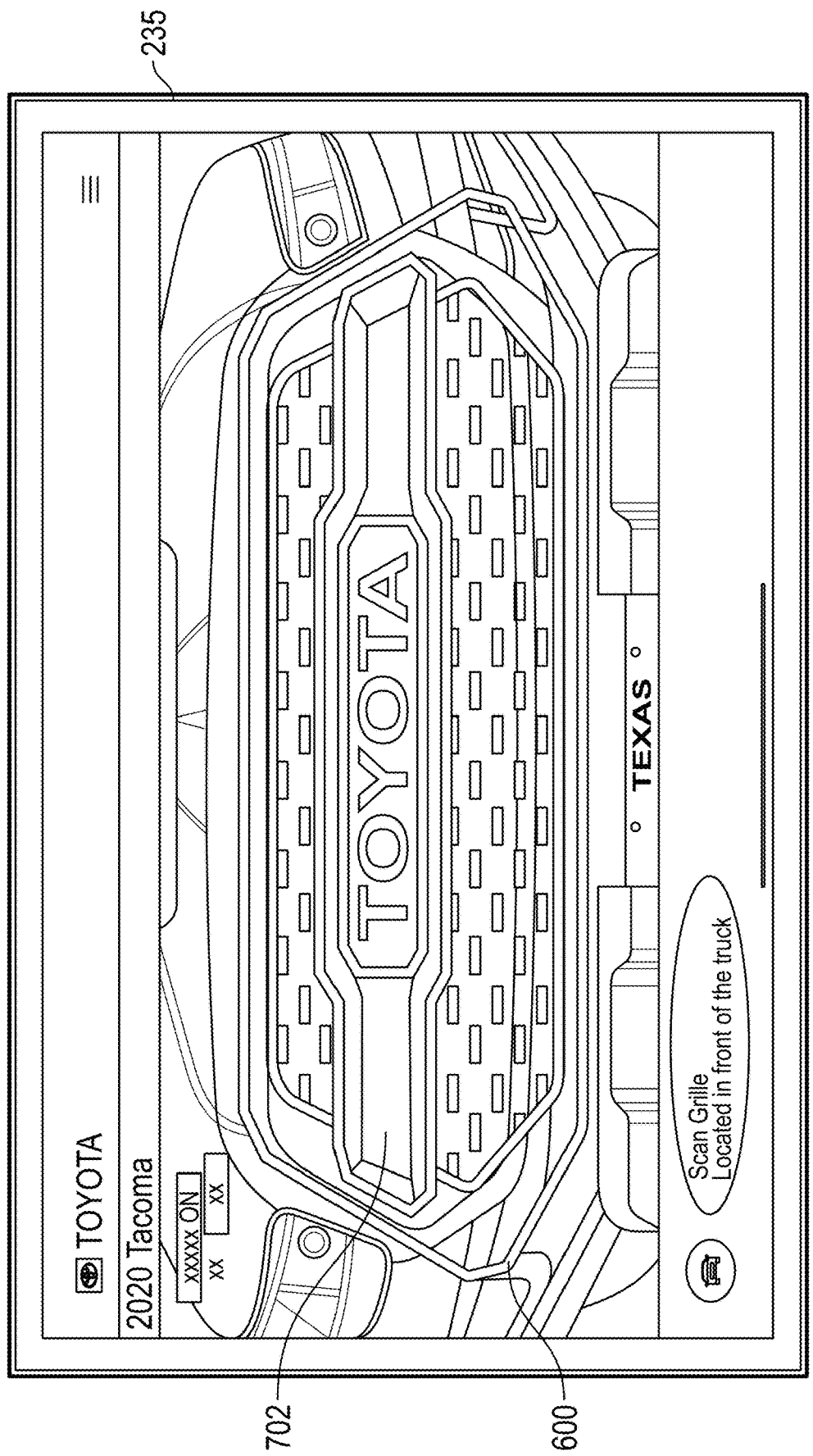
FIG. 7 depicts an illustrative example of the registration feature being aligned with the real-world feature on the identified object as displayed on the display of the device as a user orients the device to align the registration feature and the real-world feature, according to one or more embodiments described and illustrated herein.

FIG. 7 depicts a user positioning the camera 233 of the electronic device 104 in compliance with instructions displayed on a page of the display 235, according to one or more embodiments described and illustrated herein. Specifically, FIG. 7 depicts a user moving the electronic device 104 to align the registration feature 600 (e.g., a virtual image of the grille) with the grille shaped pattern 702 formed on the front of the example vehicle 404, e.g., based on instructions such as "Scan Grille Located In Front of the Truck". In embodiments, the registration feature 600 may remain stationary within an augmented reality environment on a page displayed on the user interface 300, while one or more objects appearing in the background of the display 235 (e.g., real world objects in the live video stream) may vary, e.g., based on movement of the electronic device 104. In embodiments, the user may move the electronic device 104 near a portion of the example vehicle 404 such that the registration feature 600 aligns with corresponding features such as the grille shaped pattern 702, as depicted in FIG. 7.

Upon alignment, the augmented reality system described herein may retrieve a virtual wireframe model within an augmented reality environment. In some embodiments, the virtual wireframe model may be generated by combining multiple wireframe model segments, which may be generated by analyzing perspective images of the example vehicle 404 in the physical environment. These perspective images may correspond with different orientations of the vehicle in the physical environment. Details regarding the manner in which the virtual wireframe model is generated and utilized will be described later on in this disclosure. Furthermore, the process of aligning a fixed sized registration feature with the corresponding feature on the vehicle enables the electronic device 104 to determine the dimensionality of the image data being received by the camera 233. The dimensionality may be continually updated through the motion of the electronic device 104 based on input from the one or more motion sensors 234 of the electronic device 104. In other words, the electronic device 104 is able to determine with a high degree of accuracy the real-world dimensions of the object within the image data based the alignment of the registration feature 600 which has known dimensions with the corresponding feature on the object. In the present example, this is the grille of the vehicle.

Figure 8:
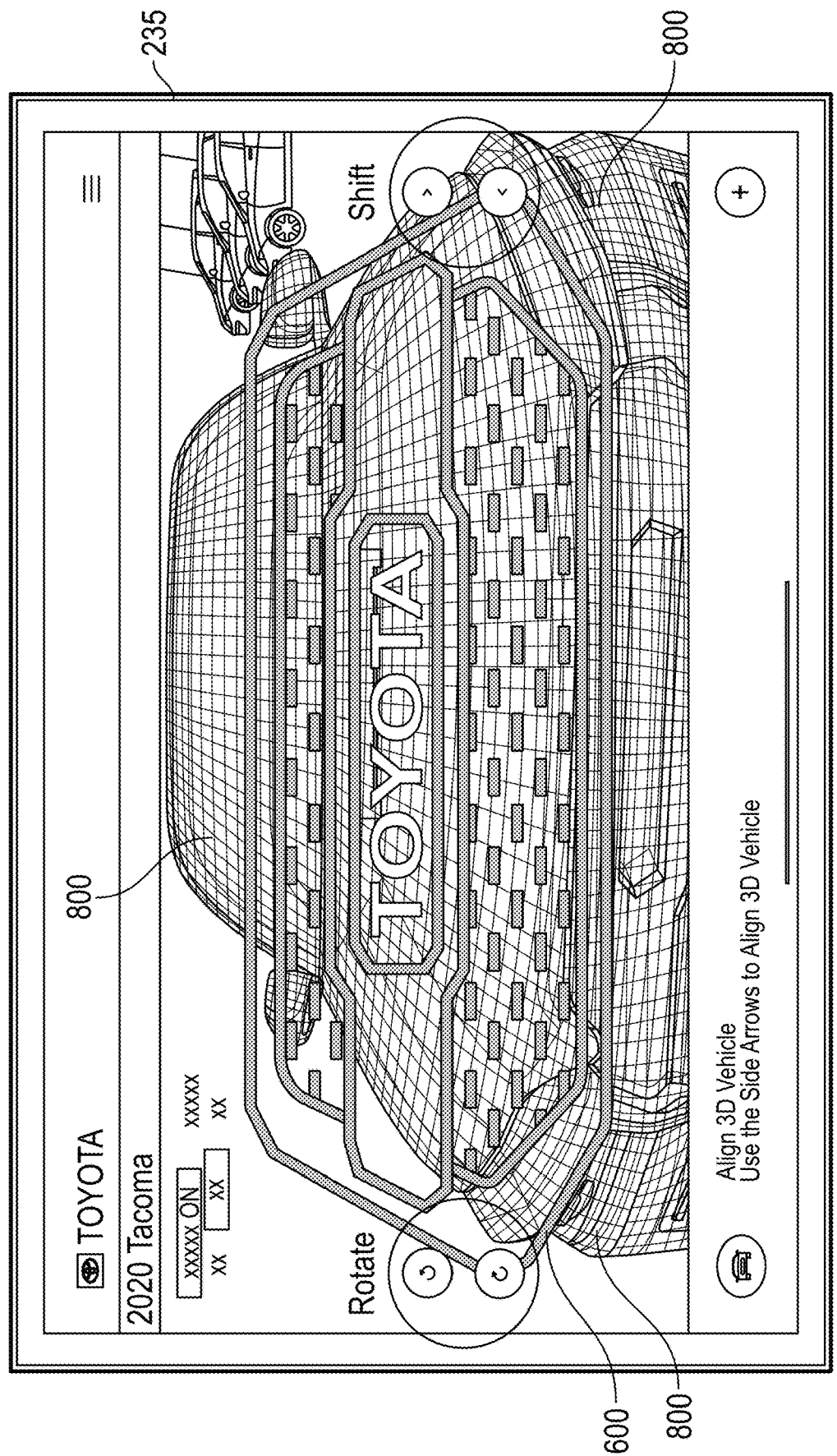
FIG. 8 depicts an illustrative example of a multi-dimensional wireframe model of the identified object being registered with the identified object within the real-world environment as captured by the imaging device of the device, according to one or more embodiments described and illustrated herein.

Once the electronic device 104 ascertains dimensionality data for the image data, the electronic device 104 may register a multi-dimensional wireframe model of the identified object with the real-world object being captured by the camera 233. For example, FIG. 8 depicts an illustrative example of a multi-dimensional wireframe model of the identified object being registered (i.e., correctly aligned) with the identified object within the real-world environment as captured by the imaging device, according to one or more embodiments described and illustrated herein. It should be understood that the multi-dimensional wireframe model may not be visible to the user on the display 235, but rather be hidden from view so that the user merely sees a real-time view of the vehicle as the user is instructed to move about the environment to capture additional perspectives of the object so that the electronic device 104 may accurately lock the multidimensional model to the real-world object.

In response to capturing various perspective images (a first perspective image) of the example vehicle 404, the processor 230 may identify additional features of the vehicle such as the front bumper, front head lights, front hood, and the back portions of the side view mirrors. These additional features may be correlated with the corresponding portions of the multi-dimensional wireframe model so that when virtual accessories are selected to be added to the vehicle in the augmented reality environment, they may be attached to the multi-dimensional wireframe model and continuous processing of the real-time image data can be avoided in order to accurately and seamlessly position the virtual accessory in the augmented reality environment with respect to its installation location on the vehicle. Other characteristics such as contours of the vehicle and the presence of various components on the vehicle, may also be identified by the processor 230 using the trained machine learning model. Thereafter, using these dimensions, the processor 230 may associate the multi-dimensional wireframe model 800 with the real-world representation of the object. As depicted in FIG. 8, the multi-dimensional wireframe model 800 appears to overlay the front bumper, front head lights, front hood, and the back portions of the example vehicle 404. These portions are located in the first perspective image of the example vehicle 404. Corresponding portions of the multi-dimensional wireframe model 800 may mapped onto the contours of the example vehicle 404.

In some embodiments, the multi-dimensional wireframe model 800 may not be visible to a user, but nonetheless overlay the front portions of the vehicle, as described above. Additionally, in some embodiments, a graphical user interface may be displayed having manual controls for adjusting the multi-dimensional wireframe model 800. The graphical user interface may include icons such as "rotate" and "shift". When selected, these icons enable a user to modify the position of the multi-dimensional wireframe model 800 relative to the example vehicle 404 within the augmented reality environment. The page displayed in the display 235 may also include instructions for the user to align the camera 233 to capture image data of another portion of the vehicle. For example, instructions may be for the user to align the camera 233 to capture image data of the side mirror adjacent to the driver seat.

Figure 9:
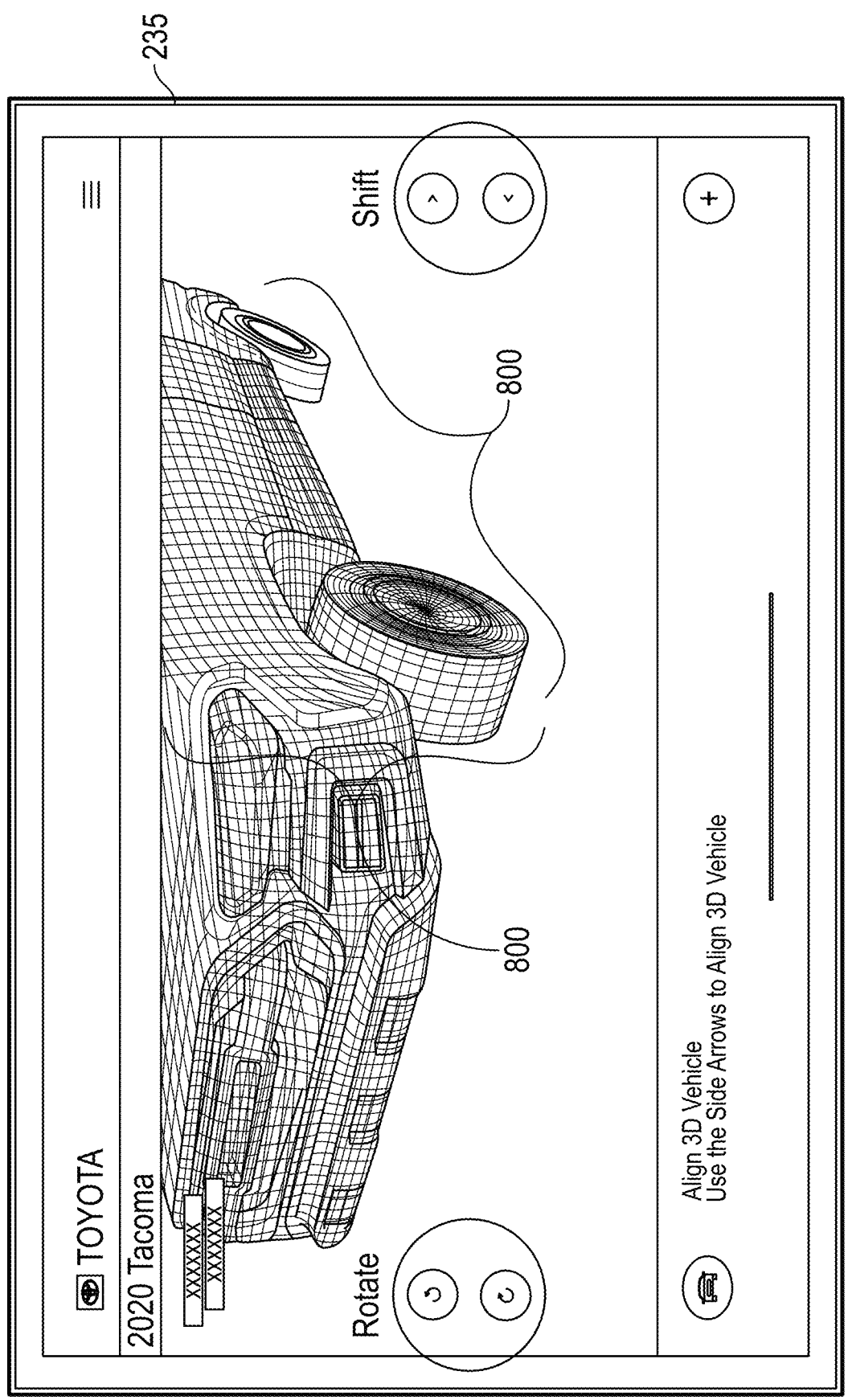
FIG. 9 depicts another illustrative view of the multi-dimensional wireframe model being registered with the identified object within the real-world environment as additional points of view of the identified object are captured by the imaging device of the device, according to one or more embodiments described and illustrated herein.

FIG. 9 depicts another portion of the multi-dimensional wireframe model 800 overlaying the driver side portions of the example vehicle 404, according to one or more embodiments described and illustrated herein. Specifically, in compliance with the above described instructions, the user may align the camera 233 with the side mirror adjacent to the driver seat. Thereafter, another perspective image (e.g., a second perspective image) corresponding to another orientation of the example vehicle 404 in the physical environment of the user may be captured. For example, the captured image may include areas ranging from the front right headlight to the back right-tire of the vehicle and areas from the bottom of the front and back right tires to the top portion of the example vehicle 404 on the driver side. Thereafter, the processor 230 may identify dimensions of the example vehicle 404 specific to these areas. Using these dimensions, the processor 230 may associate this additional portion of the multi-dimensional wireframe model 800 with the image data of the real-world environment. The multi-dimensional wireframe model 800 may overlay and map to corresponding areas of the example vehicle 404 included in the second perspective image, e.g., portions from the bottom of the front and back tires to the top portion on the driver side of the example vehicle 404.

Figure 10:
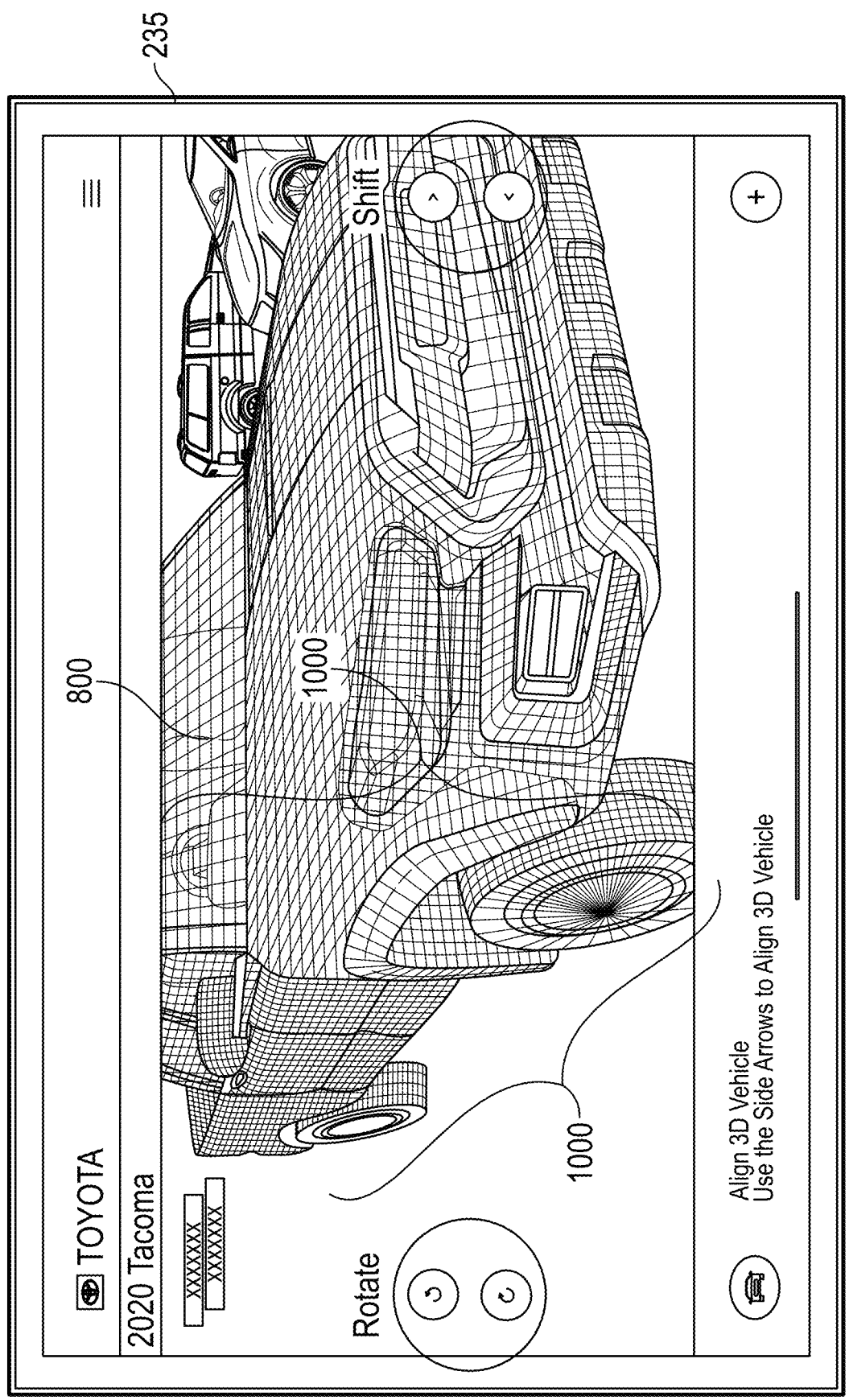
FIG. 10 depicts another illustrative view of the multi-dimensional wireframe model being registered with the identified object within the real-world environment as additional points of view of the identified object are captured by the imaging device of the device, according to one or more embodiments described and illustrated herein.

FIG. 10 depicts another illustrative view of the multi-dimensional wireframe model 800 being registered (i.e., correctly aligned) with the identified object within the real-world environment as additional points of view of the identified object are captured by the imaging device of the device, according to one or more embodiments described and illustrated herein. Specifically, in compliance with certain instructions displayed on the display 235, the user may align the camera 233 with the side mirror adjacent to the passenger seat. Thereafter, another image (e.g., a third perspective image) corresponding to another orientation of the example vehicle 404 may be captured, namely an image that includes the areas ranging from the front left headlight to the back-left tire and areas from the bottom of these tires to the top portion on the passenger side of the example vehicle 404. Thereafter, the processor 230 may, using the machine learning trained model accessible via the software application, identify dimensions of the example vehicle 404 specific to these areas. Using these dimensions, the processor 230 may map the corresponding portions of the multi-dimensional wireframe model 800 to the real-world vehicle captured in the image data. That is, the multi-dimensional wireframe model 800 may be a three-dimensional spatial model that is mapped onto the contours of the vehicle corresponding to the passenger side portions of the example vehicle 404.

Figure 11:
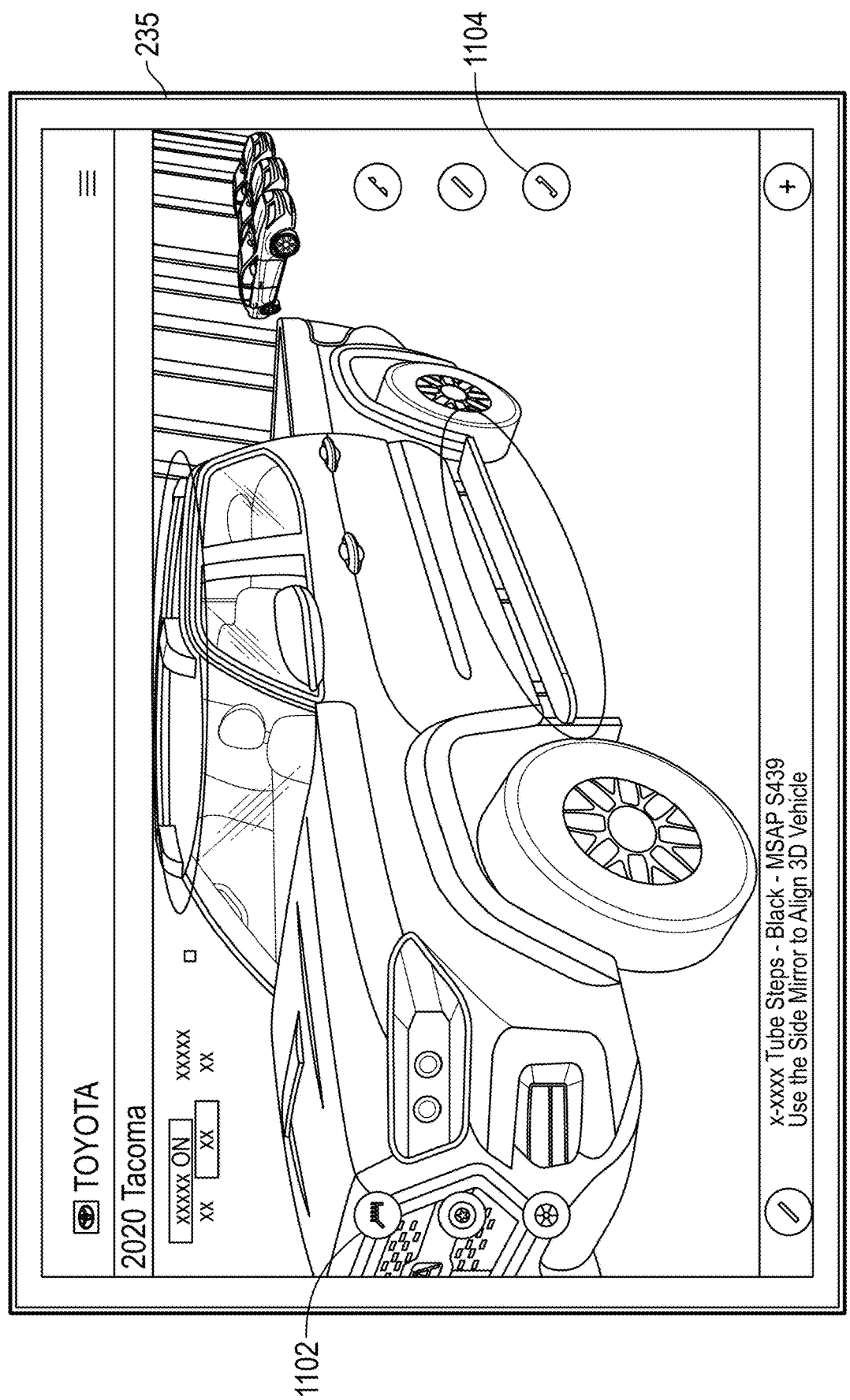
FIG. 11 depicts an example virtual accessory corresponding to the identified object being presented as a seamless component added to the identified object within the real-world environment on the display of the device within an augmented reality environment, according to one or more embodiments described and illustrated herein.

Once the multi-dimensional wireframe model 800 is registered (i.e., correctly aligned) to the real-world vehicle captured in the image data as depicted in FIG. 10, the electronic device 104 is ready to begin attaching virtual accessories to the multi-dimensional wireframe model and display them to the user in the augmented reality environment presented on the display 235. FIG. 11 depicts an example virtual accessory corresponding to the identified object being presented as a seamless component added to the identified object within the real-world environment on the display of the device, according to one or more embodiments described and illustrated herein. For example, the system described herein may display a vehicle add-on features page so the user may select one or more accessories to be installed virtually on the vehicle. The display 235 may include a plurality of symbols corresponding to various vehicle components, e.g., rims, running boards, etc. Each of these symbols may be selectable. In embodiments, upon selection of a symbol corresponding to a virtual component (e.g., a vehicle component) from the vehicle add-on features page on the display 235, the system described herein may attach the virtual component to the corresponding portion of the multi-dimensional wireframe model 800. It is noted that the multi-dimensional wireframe model 800 may overlay all portions of a live video stream of the example vehicle 404 in the physical environment of the user, and both the multi-dimensional wireframe model 800 and the live video stream of the example vehicle 404 may simultaneously be displayed on the display 235 (i.e. the augmented reality environment). In this way, the virtual accessory may also be displayed within the augmented reality environment.

Still referring to FIG. 11, symbols 1102 and 1104 associated a roof rack and a running board may be selected. In response, the processor 230 may, automatically and without user intervention, attach (or instruct the software application to attach) virtual components associated with the roof rack and the running board onto a portion of the multi-dimensional wireframe model 800. Thereafter, these virtual components may appear to overlay an area on the roof of the example vehicle 404 and the area in between the front right and back right tires of the vehicle within the augmented reality environment. Additionally, as illustrated, these components are displayed on portions of the vehicle such that the virtual components appear realistic and well-integrated with the example vehicle 404 in the augmented reality environment. Primarily because the virtual components correspond to specific portions of the multi-dimensional wireframe model 800, which in turn has been generated, using the trained machine learning model, so as to accurately fit the contours and dimensions of the example vehicle 404. In this way, any virtual components associated with various vehicle add-on features appear as if these components were real world objects installed on the example vehicle 404 within the physical environment of the user.

In some embodiments, a user may select a virtual accessory associated with a vehicle (e.g., a vehicle add-on accessory), a version of which may already be installed on the example vehicle 404. For instance, the example vehicle 404 may include a running board, and the user may select a running board of a different brand with different dimensions. In response, the system described herein may attach the selected virtual accessory (e.g., the virtual running board) onto the multi-dimensional wireframe model 800 such that the selected virtual running board may be displayed over a current running board within the augmented reality environment. To provide a user with a realistic view of the manner in which the selected running board may appear on the example vehicle 404, e.g., once it is installed on the vehicle, the system may utilize one or more occlusions (e.g., digital occlusions). These occlusions may be generated near locations on the multi-dimensional wireframe model in which the virtual component is attached and serve the purpose of preventing aspects of the currently installed running board from being displayed. In this way, the system described herein presents users with a display of a virtual component within an augmented reality environment such that the user may perceive the virtual component as accurately installed on a real-world object, namely the example vehicle 404 within the physical environment of the user.

Figure 12:
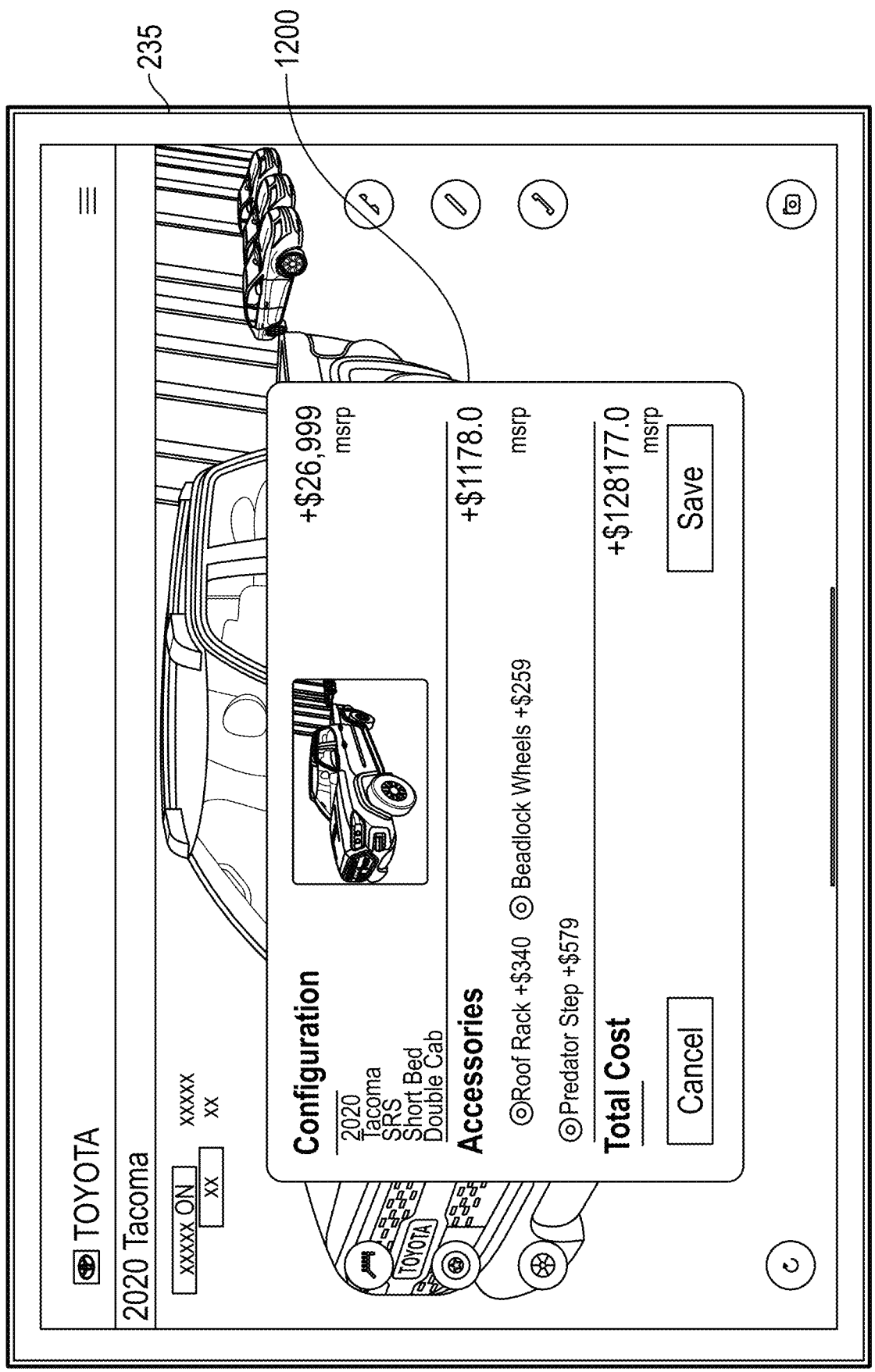
FIG. 12 depicts an example quote for the object and the selected accessories depicted in the augmented reality environment presented on the display of the device, according to one or more embodiments described and illustrated herein.

FIG. 12 schematically depicts an example quote for the object and the selected accessories depicted in the augmented reality environment presented on the display of the device, according to one or more embodiments described and illustrated herein. For example, after a user selects one or more virtual accessories, and these virtual accessories are displayed accurately and realistically on various parts of the example vehicle 404, the system described herein may display a configuration page that lists various types of information related to the example vehicle 404. For example, the configuration page may list the year, make, and model of the example vehicle 404, various vehicle add-features (e.g., virtual components associated with these features may have been displayed as overlaying the example vehicle 404 in the augmented reality environment), and the total cost or purchase price (e.g., pricing information) associated with the example vehicle 404. Additionally, the user may be provided with an option to save the vehicle and the selected vehicle add-on features. In some embodiments, images of the example vehicle 404 with the one or more virtual components included on these images may be saved.

Figure 13:
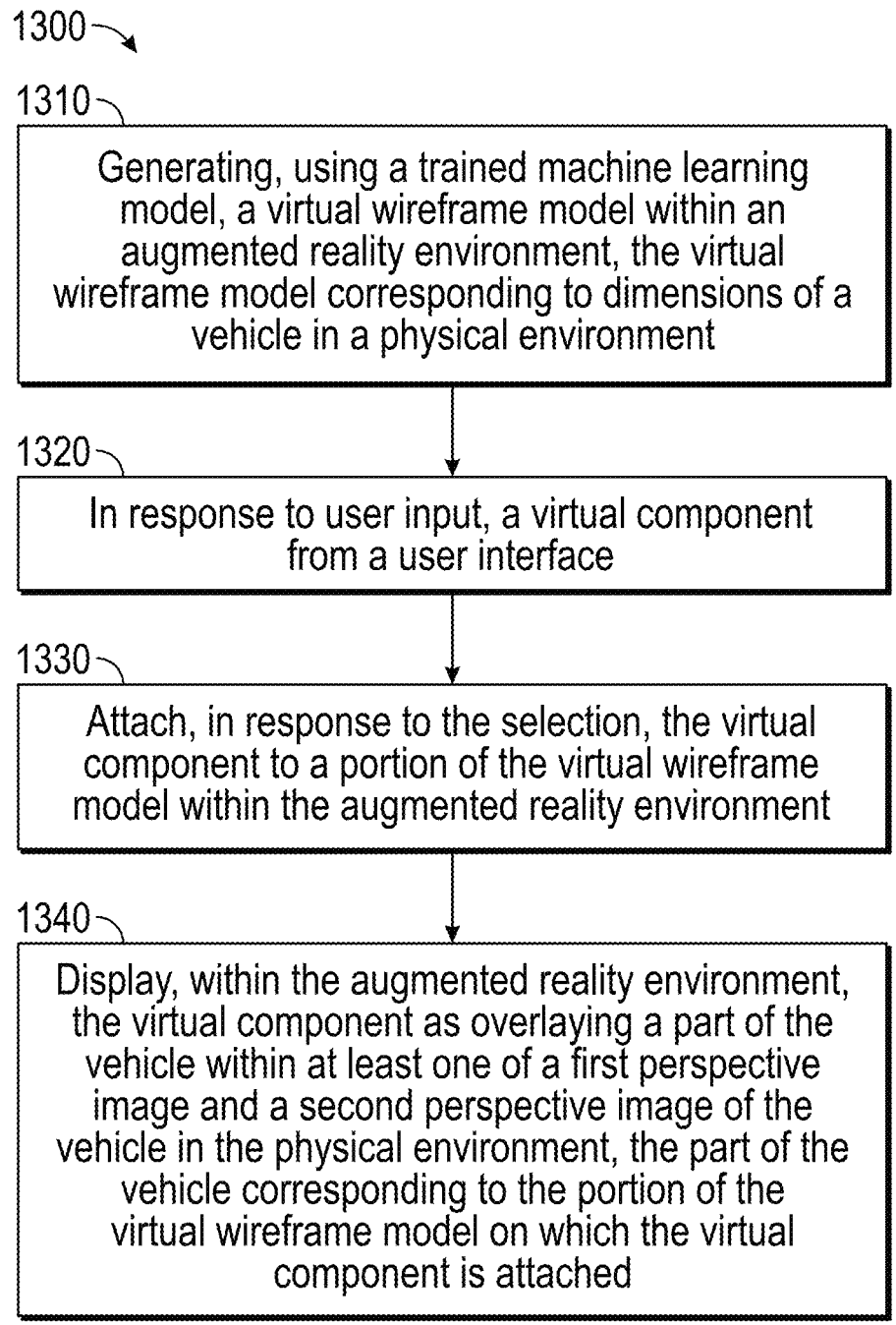
FIG. 13 depicts an illustrative flow diagram of a method for facilitating an accurate, precise, and seamless presentation of a virtual accessory added to the identified object within the real-world environment on the display of the device in the augmented reality environment, according to one or more embodiments described and illustrated herein.

FIG. 13 depicts an illustrative flow diagram 1300 of a method for facilitating an accurate, precise, and seamless presentation of a virtual accessory added to the identified object within the real-world environment on the display of the device in the augmented reality environment, according to one or more embodiments described and illustrated herein. At block 1310, the processor 230 may generate, using a trained machine learning model, the multi-dimensional wireframe model 800 within an augmented reality environment. The multi-dimensional wireframe model 800 may correspond to dimensions of a vehicle in a physical environment of the user. In some embodiments, the processor 230 may use the trained machine learning model to analyze the subject matter of perspective images of the example vehicle 404 that may be captured from different orientations. These images may be analyzed, using the trained machine learning model, to identify various dimensions of the vehicle. Thereafter, the processor 230 may (or instruct the software application to) map three-dimensional spatial models onto one or more areas of the vehicle included in the perspective images. In this way, the multi-dimensional wireframe model 800 corresponding to the identified object may be retrieved.

At block 1320, the processor 230 may enable a user to select a virtual component by selecting a symbol associated with the virtual component that is included on a page displayed on the display 235 of the electronic device 104. In embodiments, the user input may be based on a user clicking the symbol via an external device (e.g., a mouse), or by choosing the symbol using the user's fingers. At block 1330, in response to the selection, the processor 230 may attach the virtual accessory to a portion of the multi-dimensional wireframe model 800 within the augmented reality environment. Thereafter, at block 1340, the processor 230 may display, within the augmented reality environment, the virtual component as overlaying a part the vehicle within at least one of a first perspective image and a second perspective image of the vehicle in the physical environment. It is noted that the part of the vehicle may correspond to the portion of the multi-dimensional wireframe model 800 on which the virtual component is attached.

Figure 14:
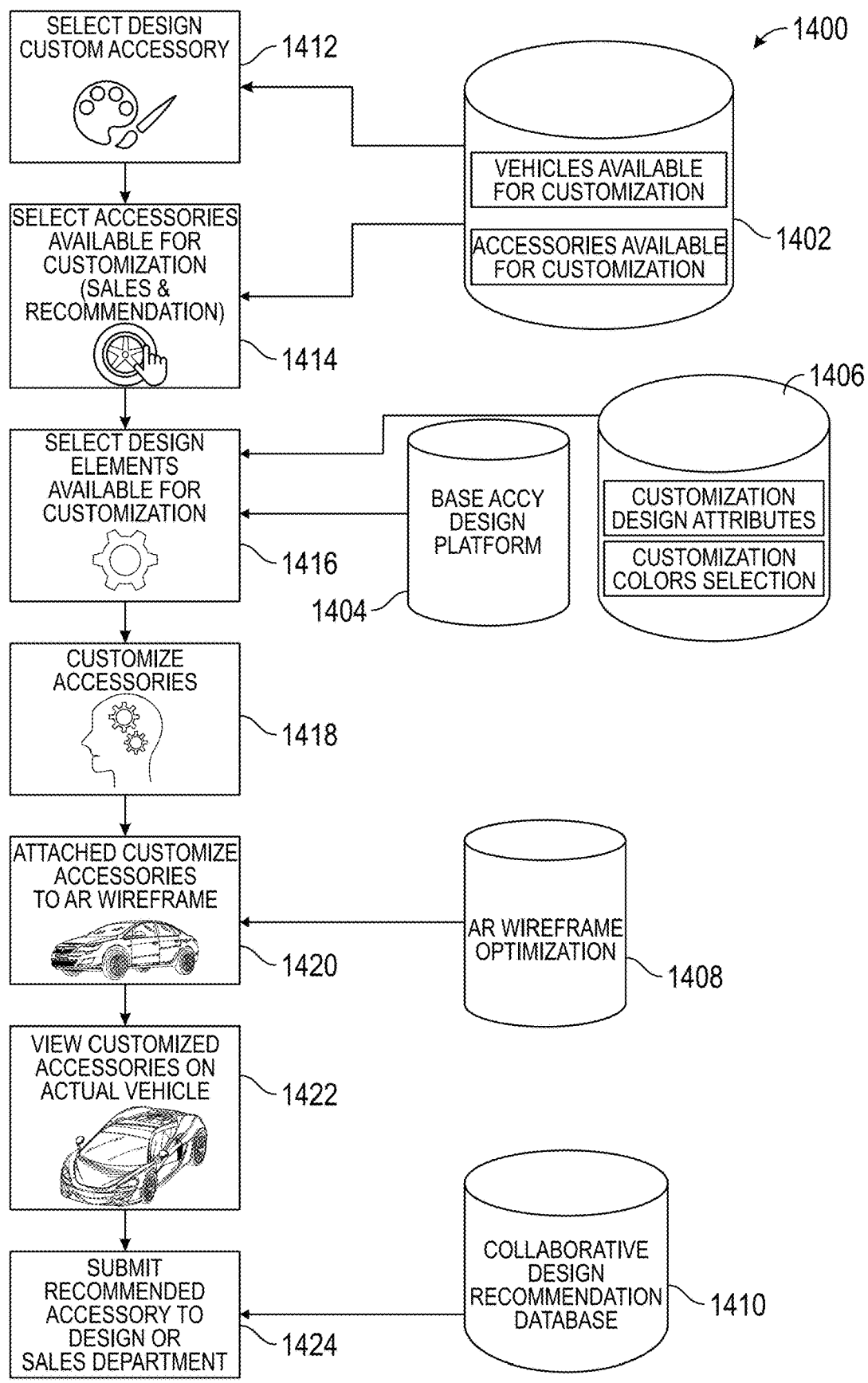
FIG. 14 is a block diagram of a system and flow diagram for the collaborative design and customization of various accessories of vehicles, according to certain illustrative embodiments of the present disclosure.

In yet other alternative illustrative embodiments of the present disclosure, the virtual automotive accessories may be customized and locked onto the real-world vehicles in the physical environment. FIG. 14 is a block diagram of a system 1400 and flow diagram for the collaborative design and customization of various accessories of vehicles. System 1400 may be used in conjunction with any of the computing networks described herein, such as the computing network or devices of FIG. 1 or 2. In addition, system 1400 may include a database 1402 that includes data related to the vehicles available for customization and the accessories available for customization. Another database 1404 is included that stores data related to baseline automotive accessories, which are basic, generalized accessory designs that may be modified in a variety of ways, as will be described below.

Database 1406 includes data related to color and design attributes/characteristics of the baseline accessories that can be customized. In certain embodiments, these characteristics may include the shape, material used, color, logo, texture, angle, slope or dimensions of the baseline accessories. Database 1408 includes the software and data necessary to achieve the wireframe modeling described herein to optimize the attachment of the virtual accessories to the physical vehicle in the augmented reality environment. Database 1410 stores data related to the customized designs of various users and provides the data retrieval for the aggregation functionality described herein.

Still referring to FIG. 14, database 1402 is used in conjunction with the selection of the accessory desired to be customized at block 1412. Database 1402 will include all accessories available for sale. In addition, although not shown, database 1402 may be in communication with database 1410 in order to retrieve recommended accessory designs and/or other accessories which have previously been customized by other users. Such accessories and/or their customized designs may be recommended to the users at block 1414.

Databases 1404 and 1406 work in conjunction with block 1416 where certain elements of the selected accessory (e.g., a baseline accessory or a pre-customized recommended accessory) is selected for customization. For example, that element (or characteristic) may be the color of the accessory. In other examples, it may the texture of the material used to make the accessory, etc. In yet other examples, the element may be the slope of a surface or an angle of the accessory. At block 1418, the customization is performed via, for example, a user display of the interactive system 1400.

At block 1420, system 1400 then attaches the customized accessory to the physical vehicle in the augmented reality environment via, for example, the wireframe modeling described herein. The customized accessory can then be viewed on the actual vehicle in the augmented reality environment, at block 1422 via the user device. At block 1424, system 1400 may then transmit the finalized accessory to a design or sales department of the vehicle manufacturer, where the information is stored in database 1410. In certain examples, the finalized designs may be aggregated from multiple users and used to determine which designs are worthy of manufacturing, hence the collaborative aspect of the present disclosure. For example, if a certain threshold number of accessories are sought to be customized, the system 1400 may determine that accessory is worthy of being offered for customization (e.g., based on profitability). In other examples, user customizations may be recommended to other users based upon their profiles or related characteristics. Thereafter, system 1400 may communicate the decision (yes or no) to the user via a user device to inform the user if their selected accessory can be customized or not.

Figure 15A:
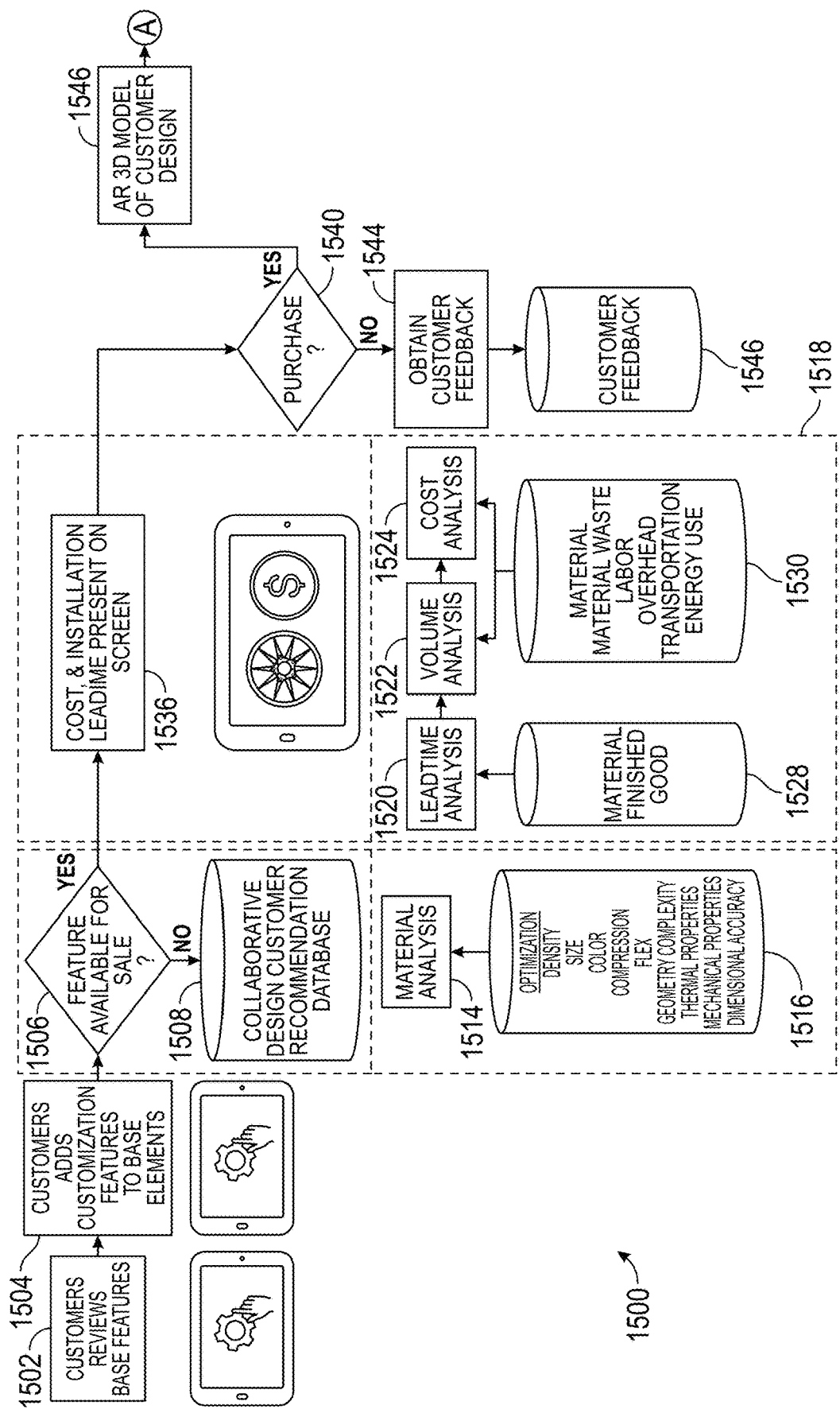
FIGS. 15A and 15B illustrate a block diagram of a system and flow diagram for an automotive accessory custom design and manufacturing 3D printing process, according to certain illustrative embodiments of the present disclosure.
Figure 15B:
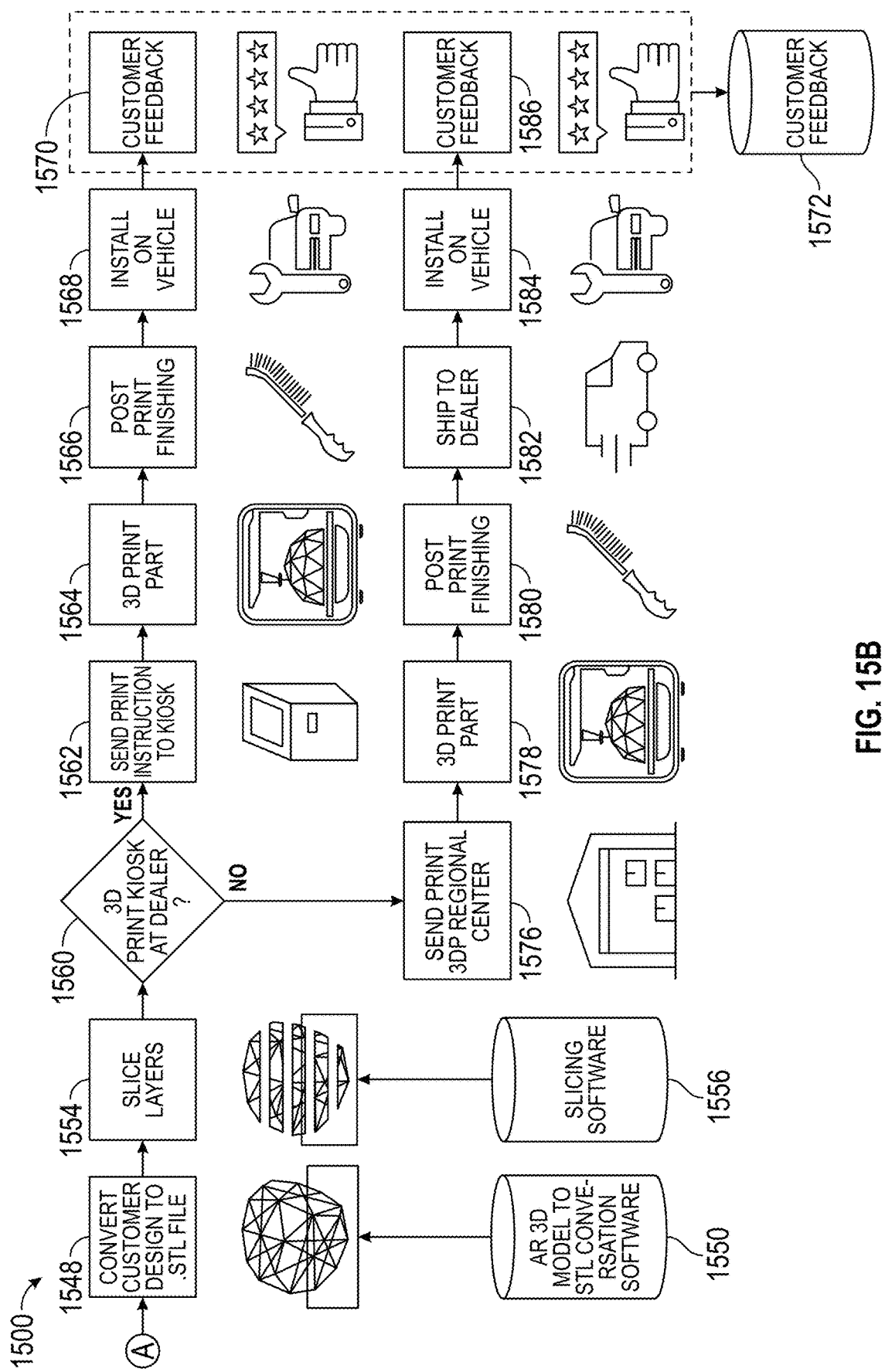

In yet other alternative illustrative embodiments of the present disclosure, finalized designs of virtual automotive accessories may progress from AR-designed parts to 3D printed designs that would be manufactured either at the dealer, a regional printing center, or other location. As a result, bespoke products may be manufactured that have been designed within the AR environment, such as via system 1400, described above. FIGS. 15A and 15B illustrate a block diagram of a system 1500 and flow diagram for the 3D printing of custom designed vehicle accessories. System 1500 may be used in conjunction with any of the computing networks described herein, such as the computing network or devices of FIG. 1 or 2. System 1500 may be implemented in system 1400, such as at block 1418 or block 1424, described above. Although described with reference to 3D printing, system 1500 may be applied to any rapid manufacturing process.

At block 1502, a user reviews one or more base features of an automotive accessory for a vehicle (e.g., a baseline accessory or a pre-customized recommended accessory). For example, a user may select a desired vehicle accessory for customization via a user device of interactive system 1400. Once a vehicle accessory is selected, the user may review the accessory's base features (e.g., color, material, texture, dimensions, etc.)

At block 1504, the user may add customization features to the base elements of the selected vehicle accessory. For instance, the user may change one or more of the base elements as desired, such as color, material, dimensions, etc. The customization may be performed by the user via the user device. The user device may be a tablet, smartphone, laptop, or other computing device.

At block 1506, system 1500 determines whether the customized accessory (e.g., a new submission of a finalized AR-designed automotive accessory) is available for sale to the user, such as whether the custom design can be fabricated using 3D printing processes and whether the resulting component would meet quality and durability criteria, among others. For example, if the new submission fails to meet a certain criterion (e.g., if the number of requested accessories is below a threshold number, there exists a material shortage, the new submission does not meet vehicle, manufacture, or regulatory specifications, or the like), block 1506 may determine that the new submission is not worthy of being offered for sale (e.g., based on profitability, supply chain, or other factors). If the new submission is not available for sale, the new submission may be stored in database 1508. Database 1508 may store data related to new submissions of various users and provide data retrieval, such as for aggregation functionality or further analysis.

In embodiments, the determination of whether a feature is available for sale may include a material analysis (block 1514). Block 1514 may analyze one or more material properties of the new submission, such as to determine material inventory needs, material profitability, etc. Block 1514 may include a material assessment that includes an analysis and/or optimization of the design by evaluating the attributes of the features such as the density, size, color, compression, flex, geometry complexity, thermal properties, dimensional accuracy and the like. Database 1516 may store material data, such as material density, size, color, compression, flex, geometry complexity, thermal properties, mechanical properties, dimensional accuracy, etc., such as for aggregation functionality or further analysis (e.g., optimization).

If block 1506 determines the new submission is available for sale, process may proceed to an assessment subsystem 1518. Assessment subsystem 1518 may include one or more analysis blocks or modules. For instance, assessment subsystem 1518 may include a lead-time analysis (block 1520), a volume analysis (block 1522), and a cost analysis (block 1524), or any combination thereof. Assessment subsystem 1518 may determine that a new submission is worthy of being offered for sale on a mass scale. In embodiments, assessment subsystem 1518 may determine a pricing and/or a delivery timing for the new submission.

Block 1520 may analyze one or more lead-times, such as related to material and finished goods. Block 1520 may analyze the availability of material and time to process a finished good. Database 1528 may store data related to material and finished good lead-times and provide data retrieval, such as for aggregation functionality or further analysis.

Block 1522 may perform volume analysis and block 1524 may perform cost analysis related to one or more new submissions. Block 1522 may include evaluating the demand for the custom accessory from requests submitted by one or more customers. Block 1524 may include determining the material waste, material type and cost, the labor and overhead to fabricate the accessory, transportation to the customer and energy usage throughout the process. Database 1530 may store data supporting blocks 1522 and 1524, such as material, material waste, labor, overhead, and transportation, and energy use data, among others.

At block 1536, system 1500 may communicate a pricing, lead-time, and/or delivery timing to the user. For example, based on analysis performed by subsystem 1518, system 1500 may determine a price and estimated delivery to manufacture the new submission, with the price and estimated delivery communicated to the user for review and acceptance. The pricing, lead-time, and/or delivery timing may be presented to the user via user device. At block 1540, system 1500 may query the user to purchase, such as via user device.

If the user decides not to purchase, block 1544 may obtain customer feedback. For example, the user may be requested to provide the reasons for not purchasing, such as price, delivery, etc. Database 1546 may store data related to the received customer feedback, such as for aggregation functionality or further analysis.

If the user decides to purchase, block 1546 may create a 3D model of the customer design, such as in the augmented reality environment via, for example, the wireframe modeling described herein. At block 1548, system 1500 then converts the customer design to a usable surface geometry file format, such as to an .STL file or another suitable format. As shown, system 1500 includes a conversion software 1550 (e.g., an AR 3D model to STL conversion software) configured to provide the necessary or desired file conversion from the 3D model. At block 1554, system 1500 then slices the converted file into layers. For example, system 1500 may include a slicing software 1556 configured to slice the converted file into multiple layers suitable for 3D printing.

At block 1560, system 1500 determines a 3D printing location. For instance, block 1560 may determine whether to 3D print at a kiosk located at the dealer. The determination to 3D print at a dealer kiosk may be based on multiple factors, such as the size of the design, the size of kiosk, material availability at the kiosk, cost of kiosk operation, kiosk availability, kiosk working order, service technician availability, or other factors. If block 1560 determines to print at a dealer kiosk, block 1562 sends print instructions to the kiosk. At block 1564, system 1500 then 3D prints the accessory or part at the kiosk. After 3D printing is complete, system 1500 may include post print finishing operations (block 1566). Following block 1566, system 1500 may include installing the 3D printed accessory or part on the vehicle (block 1568). Following installation, block 1570 may request and/or obtain customer feedback. For example, satisfaction, comments, and other data may be requested from the user. Database 1572 may store data related to the customer feedback received at block 1570, such as for aggregation functionality or further analysis.

If block 1560 determines not to print at a dealer kiosk, system 1500 may include sending print instructions to a 3D printing center (block 1576). The 3D printing center may be a local or regional facility providing 3D printing services. At block 1578, the accessory or part is then 3D printed at the 3D printing center. After 3D printing is complete, system 1500 may include post print finishing operations (block 1580). Following block 1580, the 3D printed accessory or part may be shipped to an install location (e.g., to a dealer, to the user's place of address, to an install facility, etc.). At block 1584, system 1500 may include installing the 3D printed accessory or part on the vehicle. Following installation, block 1586 may request and/or obtain customer feedback. For example, satisfaction, comments, and other data may be requested from the user. Database 1572 may store data related to the customer feedback received at block 1586, such as for aggregation functionality or further analysis.

Figure 16:
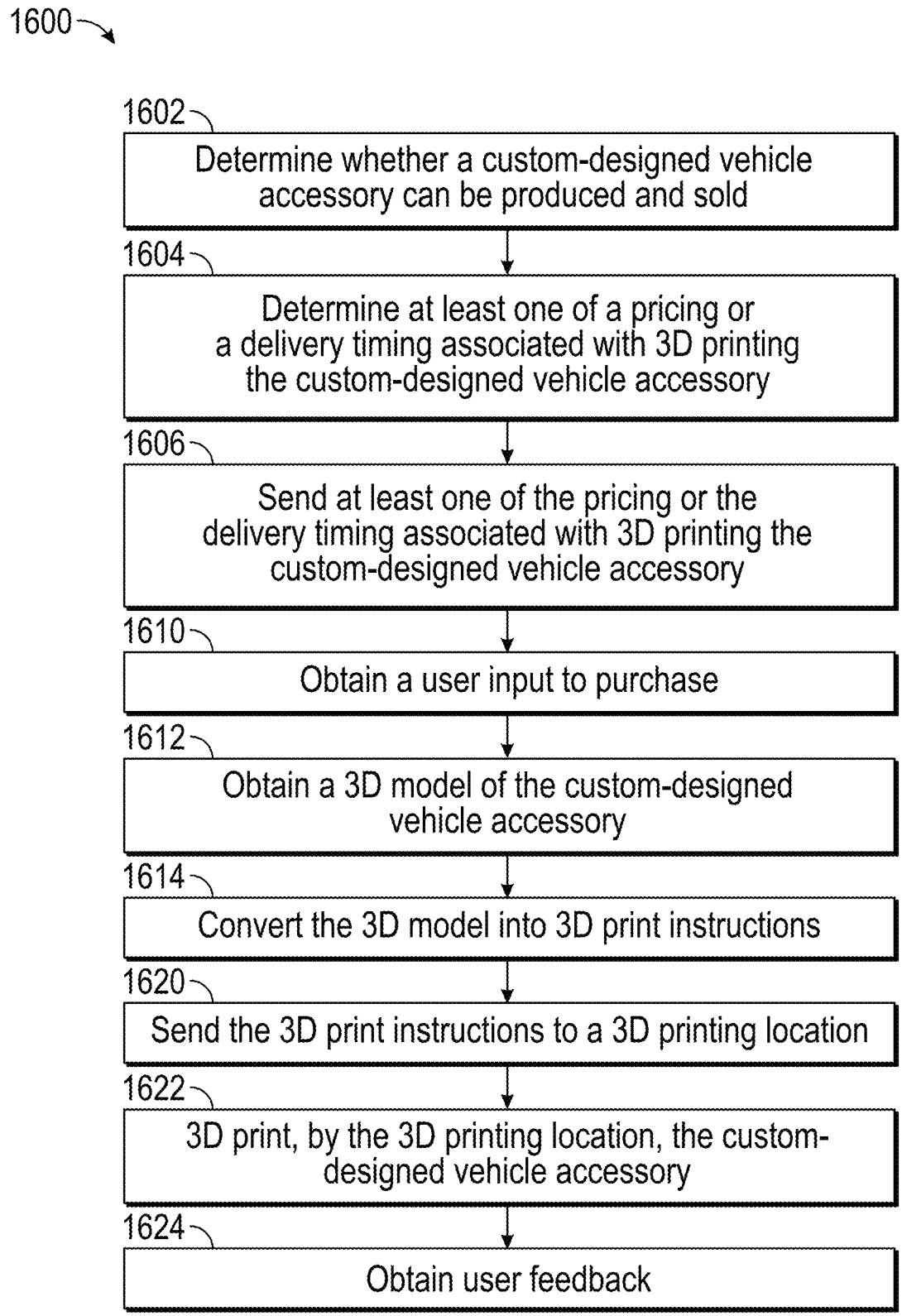
FIG. 16 is a flow chart of a method for 3D printing a vehicle accessory custom-designed in an augmented reality environment, according to certain illustrative methods of the present disclosure.

FIG. 16 is a flow chart of a method 1600 for 3D printing a vehicle accessory custom-designed in an AR environment. Method 1600 is illustrated as a set of operations, blocks, or steps and is described with reference to FIGS. 15A-15B, although method 1600 may be applied to other embodiments not illustrated in FIGS. 15A-15B. One or more steps or blocks that are not expressly illustrated in FIG. 16 may be included before, after, in between, or as part of the illustrated embodiment.

In block 1602, method 1600 may include determining whether a custom-designed vehicle accessory can be produced and sold. For example, a system may check whether the custom-designed vehicle accessory fails to meet one or more criteria, such as volume requirements, material requirements, regulatory requirements, etc. As a result, block 1602 may preliminarily assess whether the custom-designed vehicle accessory is worthy or safe of being produced and/or sold (e.g., based on profitability, regulations, specifications, etc.).

In block 1604, method 1600 may include determining at least one of a pricing or a delivery timing associated with 3D printing the custom-designed vehicle accessory. The determined pricing or delivery timing may be based on at least one of a material analysis, a lead-time analysis, a volume analysis, or a cost analysis of the custom-designed vehicle accessory. As a result, block 1604 may provide pricing and delivery unique to the specifications of the custom-designed vehicle accessory.

In block 1606, method 1600 may include sending (e.g., to a user via a user device) the at least one of the pricing or the delivery timing associated with 3D printing the custom-designed vehicle accessory. In embodiments, the user may change one or more specifications of the custom-designed vehicle accessory to alter the pricing or delivery timing. In this way, the pricing and/or delivery may be dynamic through an interactive environment, changing as the vehicle accessory is modified in the augmented reality environment. In block 1610, method 1600 may include obtaining (e.g., from the user via the user device) a user input to purchase. For example, once the price and delivery are acceptable to the user, user input may be provided to purchase and proceed to 3D printing.

In block 1612, method 1600 includes obtaining a 3D model of the custom-designed vehicle accessory. The 3D model may be obtained via the wireframe modeling described herein, such as the attachment of a virtual accessory to a vehicle in an augmented reality environment. In block 1614, method 1600 may include converting the 3D model into 3D print instructions. Converting the 3D model into 3D print instructions may be based on the obtaining the user input to purchase. Block 1614 may include converting the 3D model to a surface geometry file format (e.g. an STL format) and slicing the surface geometry file format into multiple layers suitable for 3D printing.

In block 1620, method 1600 includes sending the 3D print instructions to a 3D printing location to 3D print the custom-designed vehicle accessory. Block 1620 may include sending the 3D print instructions to a kiosk (e.g., a kiosk located at a dealer). In embodiments, the 3D print instructions may be sent to a 3D printing center, such as a local or regional facility providing 3D printing services.

In block 1622, method 1600 may include 3D printing, by the 3D printing location, the custom-designed vehicle accessory. Block 1622 may include post print finishing operations. Once printed, the custom-designed vehicle accessory may be shipped to a dealership or a customer address and/or the installed on a vehicle.

In block 1624, method 1600 may include obtaining user feedback. For example, satisfaction, comments, and other data may be requested from the user (e.g., via the user device) to improve operations and/or the experience. Data related to customer feedback may be stored in a database, such as for aggregation functionality of further analysis.

Figure 17:
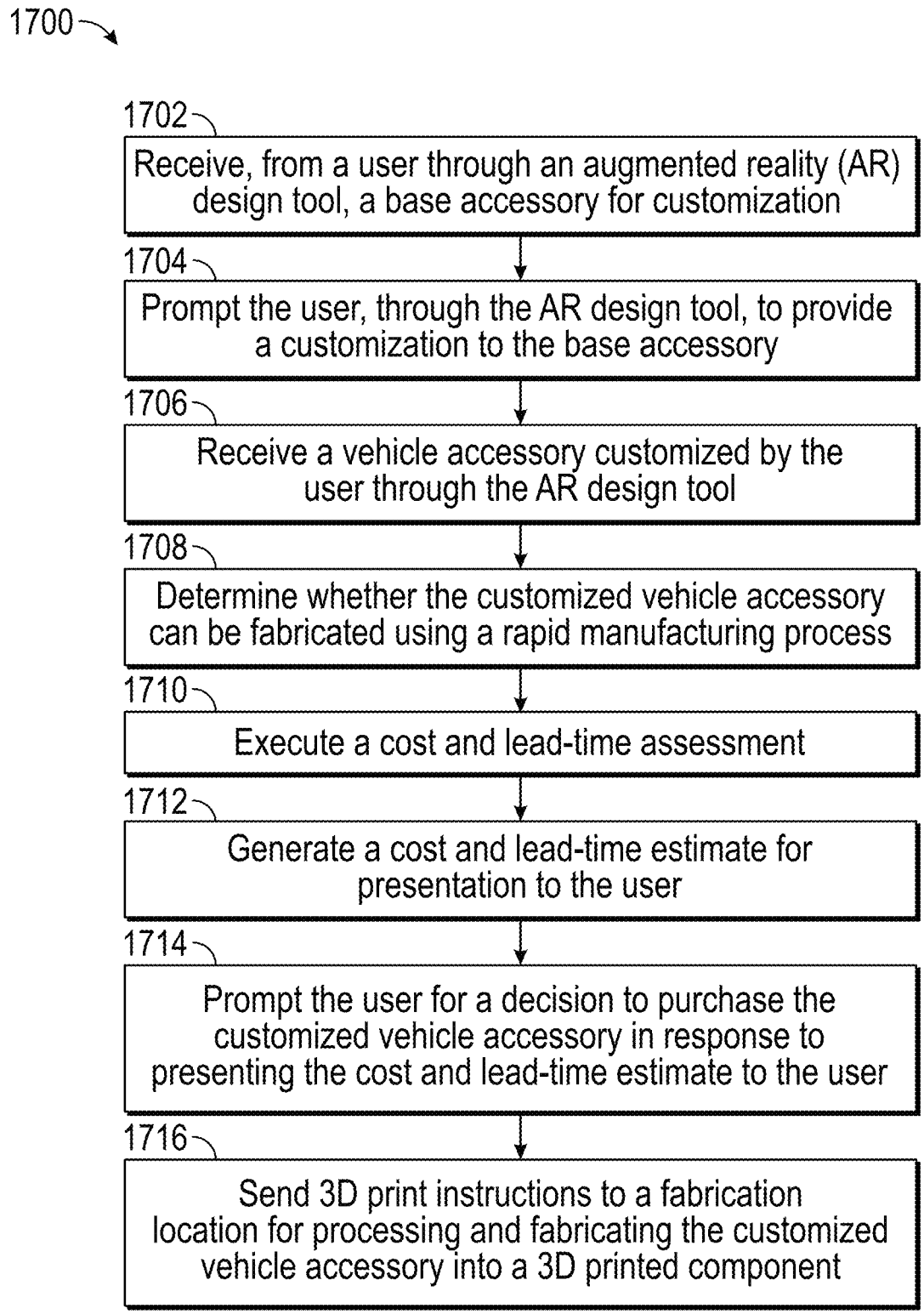
FIG. 17 is a flow chart of a method for manufacturing a vehicle accessory custom-designed in an augmented reality environment, according to certain illustrative methods of the present disclosure.

FIG. 17 is a flow chart of a method 1700 for manufacturing a vehicle accessory custom-designed in an AR environment. Method 1700 is illustrated as a set of operations, blocks, or steps and is described with reference to FIGS. 1-15, although method 1700 may be applied to other embodiments not illustrated in FIGS. 1-15. One or more steps or blocks that are not expressly illustrated in FIG. 17 may be included before, after, in between, or as part of the illustrated embodiment.

In block 1702, method 1700 may include receiving, from a user through an AR design tool, a base accessory for customization. In block 1704, method 1700 may include prompting the user, through an AR design tool, to provide a customization to the base accessory to produce a customized vehicle accessory. In block 1706, method 1700 includes receiving the vehicle accessory customized by the user through the AR design tool.

In block 1708, method 1700 includes determining whether the customized vehicle accessory can be fabricated using a rapid manufacturing process. Block 1708 may include determining whether the customized vehicle accessory can be fabricated using a 3D printing process. Block 1708 may include determining whether the customized vehicle accessory would meet quality criteria.

In block 1710, method 1700 may include executing a cost and lead-time assessment. The cost and lead-time assessment may include at least one of a material assessment, a volume analysis, or an installation assessment, such as those described herein. In block 1712, method 1700 includes generating a cost and lead-time estimate for presentation to the user.

In block 1714, method 1700 includes prompting the user for a decision to purchase the customized vehicle accessory in response to presenting the cost and lead-time estimate to the user. In block 1716, method 1700 may include sending, in response to receiving a decision to purchase the customized vehicle accessory, 3D print instructions to a fabrication location for processing and fabricating the customized vehicle accessory into a 3D printed component. The fabrication location may be a kiosk located at a dealership or a regional facility providing 3D printing services.

Furthermore, any of the illustrative methods described herein may be implemented by a system comprising processing circuitry or a non-transitory computer readable medium comprising instructions which, when executed by at least one processor, causes the processor to perform any of the methods described herein.

Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A computer-implemented method for manufacturing a vehicle accessory custom-designed in an augmented reality (AR) environment, the computer-implemented method comprising:
   receiving a vehicle accessory customized by a user through an AR design tool;
   determining whether the customized vehicle accessory can be fabricated using a rapid manufacturing process;
   generating a cost and lead-time estimate for presentation to the user; and
   prompting the user for a decision to purchase the customized vehicle accessory in response to presenting the cost and lead-time estimate to the user.

2. The computer-implemented method of claim 1, further comprising:
   receiving, from the user through the AR design tool, a base accessory for customization; and
   prompting the user, through the AR design tool, to provide a customization to the base accessory to produce the customized vehicle accessory.

3. The computer-implemented method of claim 1, wherein the determining comprises determining whether the customized vehicle accessory can be fabricated using a 3D printing process and whether the customized vehicle accessory would meet quality criteria.

4. The computer-implemented method of claim 1, further comprising executing a cost and lead-time assessment to generate the cost and lead-time estimate for presentation to the user.

5. The computer-implemented method of claim 4, wherein the cost and lead-time assessment comprises at least one of a material assessment, a volume analysis, or an installation assessment.

6. The computer-implemented method of claim 1, further comprising:
   wherein the rapid manufacturing process comprises a 3D printing process; and
   sending 3D print instructions to a fabrication location for processing and fabricating the customized vehicle accessory into a 3D printed component.

7. The computer-implemented method of claim 6, wherein the fabrication location is a kiosk located at a dealership.

8. A system for manufacturing a vehicle accessory custom-designed in an augmented reality (AR) environment, the system comprising:
   a processor to perform operations comprising:
      receiving a vehicle accessory customized by a user through an AR design tool;
      determining whether the customized vehicle accessory can be fabricated using a rapid manufacturing process;
      generating a cost and lead-time estimate for presentation to the user; and
      prompting the user for a decision to purchase the customized vehicle accessory in response to presenting the cost and lead-time estimate to the user.

9. The system of claim 8, further comprising:
   receiving a base accessory for customization from a user; and
   prompting the user, through the AR design tool, to provide a customization to the base accessory to produce the customized vehicle accessory.

10. The system of claim 8, wherein the determining comprises determining whether the customized vehicle accessory can be fabricated using a 3D printing process and whether the customized vehicle accessory would meet quality criteria.

11. The system of claim 8, further comprising executing a cost and lead-time assessment to generate the cost and lead-time estimate for presentation to the user.

12. The system of claim 11, wherein the cost and lead-time assessment comprises at least one of a material assessment, a volume analysis, or an installation assessment.

13. The system of claim 8, further comprising:
wherein the rapid manufacturing process comprises a 3D printing process; and
sending 3D print instructions to a fabrication location for processing and fabricating the customized vehicle accessory into a 3D printed component.

14. The system of claim 13, further comprising a 3D printing kiosk, wherein the 3D print instructions are sent to the 3D printing kiosk for processing and fabricating the customized vehicle accessory into the 3D printed component.

15. A method for 3D printing a vehicle accessory custom-designed in an augmented reality (AR) environment, the method comprising:
receiving, from a user through an AR design tool, a customized vehicle accessory;
determining whether the customized vehicle accessory can be fabricated using a 3D printing process;
generating a cost and lead-time estimate for presentation to the user; and
prompting the user for a decision to purchase the customized vehicle accessory in response to presenting the cost and lead-time estimate to the user.

16. The method of claim 15, further comprising:
receiving, from the user through the AR design tool, a base accessory for customization; and
prompting the user, through the AR design tool, to provide a customization to the base accessory to produce the customized vehicle accessory.

17. The method of claim 15, wherein the determining comprises determining whether the customized vehicle accessory can be fabricated using a 3D printing process and whether the customized vehicle accessory would meet quality criteria.

18. The method of claim 15, further comprising executing a cost and lead-time assessment to generate the cost and lead-time estimate for presentation to the user, wherein the cost and lead-time assessment comprises at least one of a material assessment, a volume analysis, or an installation assessment.

19. The method of claim 15, wherein:
the rapid manufacturing process comprises a 3D printing process; and
the method further comprises sending 3D print instructions to a fabrication location for processing and fabricating the customized vehicle accessory into a 3D printed component.

20. The method of claim 19, wherein the fabrication location is a kiosk located at a dealership.

* * * * *